US006005178A

United States Patent [19]

Osuga et al.

[11] Patent Number: 6,005,178

[45] Date of Patent: Dec. 21, 1999

[54] ELECTRONIC MUSICAL INSTRUMENT SIMULATING ACOUSTIC PIANO KEYTOUCH CHARACTERISTICS

[75] Inventors: Ichiro Osuga; Tsuyoshi Sato; Takamichi Masubuchi; Keisuke Watanabe; Junichi Mishima, all of Hamamatsu, Japan

[73] Assignee: Yamaha Corporation, Hamamatsu, Japan

[21] Appl. No.: 09/172,348

[22] Filed: Oct. 14, 1998

Related U.S. Application Data

[62] Division of application No. 08/409,204, Mar. 23, 1995, Pat. No. 5,895,875.

[30] Foreign Application Priority Data

| | | | |
|---|---|---|---|
| Mar. 24, 1994 | [JP] | Japan | 6-054222 |
| Mar. 28, 1994 | [JP] | Japan | 6-056450 |
| Mar. 28, 1994 | [JP] | Japan | 6-056459 |

[51] Int. Cl.[6] .......... G01C 3/12

[52] U.S. Cl. .......... 84/440; 84/423 R

[58] Field of Search .......... 84/423 R, 433, 84/434, 435, 436, 437, 438, 439, 440

[56] References Cited

U.S. PATENT DOCUMENTS

| | | | |
|---|---|---|---|
| 3,665,092 | 5/1972 | Heiman | 84/351 |
| 3,941,023 | 3/1976 | Thomas et al. | 84/1.01 |
| 3,979,990 | 9/1976 | Hinago | 84/1.24 |
| 4,351,222 | 9/1982 | Kumano et al. | 84/423 R |
| 4,476,769 | 10/1984 | Kumano | 84/434 |
| 4,512,234 | 4/1985 | Kumano | 84/433 |
| 4,604,937 | 8/1986 | Kumano et al. | 84/435 |
| 4,901,614 | 2/1990 | Kumano et al. | 84/1.1 |
| 5,204,486 | 4/1993 | Kim et al. | 84/439 |
| 5,574,241 | 11/1996 | Kumano et al. | 84/439 |

FOREIGN PATENT DOCUMENTS

| | | |
|---|---|---|
| 52-50779 | 11/1977 | Japan . |
| 54-94221 | 7/1979 | Japan . |
| 1-60254 | 4/1989 | Japan . |
| 4-172397 | 6/1992 | Japan . |
| 4-347895 | 12/1992 | Japan . |
| 4-347896 | 12/1992 | Japan . |
| 4-350697 | 12/1992 | Japan . |
| 5-8635 | 3/1993 | Japan . |
| 5-143059 | 6/1993 | Japan . |
| 5-224662 | 9/1993 | Japan . |
| 5-323952 | 12/1993 | Japan . |
| 6-202617 | 7/1994 | Japan . |

*Primary Examiner*—Robert E. Nappi
*Assistant Examiner*—Wesley Scott Ashton
*Attorney, Agent, or Firm*—Graham & James LLP

[57] ABSTRACT

A keyboard assembly for an electronic musical instrument comprises at least a plurality of keys, a key support member and a plurality of key-return springs. The key support member rotatably supports the keys; and the key-return spring is provided between the key and key support member so as to press up the key to a normal position. Mechanical parameters which affect a key scaling to key-touch responses of the keys are sizes, shapes and locations of parts of the keyboard assembly, which are set by analyzing motions of an action mechanism of an acoustic piano. For example, weight of the key is adjusted using a deadweight member so as to provide a specific key-touch response for the key. An amount of elastic resilience, made by the key-return spring, is adjusted by changing at least one location, at which one end of the key-return spring is terminated, so as to provide a specific key-touch response for the key. Viscous resistance, made by viscous material, such as grease, which is provided between a selected portion of the key and some member, such as a key guide and a support-point member, is adjusted by changing shape and/or size of that member, so as to provide a specific key-touch response for the key. The key scaling is performed by changing the key-touch response with respect to each of the keys; or the key scaling is performed by changing the key-touch response with respect to a selected division of the keyboard.

17 Claims, 23 Drawing Sheets

LOW-PITCH KEY

HIGH-PITCH KEY

LOW-PITCH KEY

ELECTRONIC MUSICAL INSTRUMENT SIMULATING ACOUSTIC PIANO KEYTOUCH CHARACTERISTICS

RELATED APPLICATION

This application is a division of application Ser. No. 08/409204, filed Mar. 23, 1995, now issued as U.S. Pat. No. 5,895,875 on Apr. 20, 1999.

BACKGROUND OF THE INVENTION

1. Field of the Invention

The present invention relates to a keyboard assembly which is applicable to an electronic musical instrument to provide a simulated touch response of an acoustic piano.

2. Prior Art

The acoustic piano provides an action mechanism which transmits a motion of key to a string. In general, reaction against depression of key is differed with respect to each of the keys of the acoustic piano; in other words, a key-touch response is differed with respect each of the keys. Specifically, the key-touch response becomes "heavy" as pitch of a key depressed becomes low, while the key-touch response becomes "light" as the pitch of the key depressed becomes high. Such difference in key-touch response is caused due to necessity of a physical structure in the action mechanism. Thus, a performer, who plays the acoustic piano, should increase depressing force made by his finger or hand when the performer depresses a key which belongs to a relatively-low pitch division in a keyboard of the acoustic piano. In contrast, the performer softens depressing force to a key which belongs to a relatively-high pitch division of the keyboard of the acoustic piano.

Next, "key scaling", which is accomplished in keyboard instruments such as the acoustic piano, will be explained. In the keyboard instrument, hammer heads are different from each other in size and hardness in accordance with lengths of strings. Specifically, a hammer head, which is provided for the relatively-low pitch division of the keyboard, is made "soft" by being wound by a relatively large felt, while a hammer head, which is provided for the relatively-high pitch division of the keyboard, is made "hard" by being wound by a relatively small felt. In addition, intensity of the spring, which is applied to the key, as well as weight of the key are different with respect to each of the keys. Those elements affect the key-touch response; and they affect determination in weight of the keys. In order to get an average weight for some of the keys, a member of lead material is put into a wood-made portion of the key. Thus, weight of the key, which belongs to the high-pitch division of the keyboard, is set at 50 gram; weight of the key, which belongs to an intermediate-pitch division of the keyboard, is set at 55 gram; and weight of the key, which belongs to the low-pitch division of the keyboard, is set at 60 gram. In short, the key scaling is performed on the reaction to the depression of key in such a way that the key-touch response is gradually lessened in a pitch-ascending order of the keys of the keyboard.

In the conventional keyboard assembly, the key scaling is tuned by adjusting a manner of winding the felt around the hammer head or by adjusting the weight of the member of lead material. However, such adjustment is hard to perform with accuracy. Therefore, it is difficult to perform a desired key scaling to key-touch responses with high precision.

In addition, the acoustic piano keyboard is designed to inevitably perform a key scaling to dynamic key-touch responses because each key is provided with a hammer or the like which has a specific mass; in other words, the specific mass causes each key to have a different resistance to depression of the key. Herein, the dynamic key-touch response can be defined as resistance to depression of key in a duration between a key-depression start timing and a key-depression end timing. In general, a person, who is familiar with a piano providing a mechanism performing a key scaling to key-touch responses, may fail to familiarize himself or herself with the keyboard of the electronic musical instrument which does not provide such mechanism. Hereinafter, the mechanism performing the key scaling to key-touch responses will be simply referred to as a "key-touch scaling mechanism".

Meanwhile, the acoustic piano has a complicated structure and requires high cost. Therefore, all of characteristics in structure of the acoustic piano cannot be directly applied to the electronic musical instrument which requires switch processing and the like. For example, the electronic musical instrument employs the keyboard which does not use the action mechanism of the acoustic piano but which uses key switches provided for the keys respectively. In some cases, mutually-slanted relationship is established between a line, which connects supporting points of the keys disposed in the keyboard, and a line which connects the key switches, wherein each key switch has a reversed-cup-like shape. This relationship may result in undesired occurrence of a key scaling to sounding-stroke positions of the keys. In other words, a sounding-stroke position of a key, which belongs to the low-pitch division of the keyboard, should be different from that of a key which belongs to the high-pitch division of the keyboard. In some case, the keyboard employs a two-make-contact-type touch-response switch which is located beneath the key at a certain position between a tip-edge portion and a supporting point of the key. In that case, a different distance, measured between the supporting point of the key and the touch-response switch, is set with respect to each of the keys. Hence, even if the finger depresses the key with same key-depression force (or at same key-depression speed), a keyboard switch output, given by depressing a key belonging to the low-pitch division, should be different from a keyboard switch output given by depressing a key belonging to the high-pitch division. Herein, the keyboard switch output is defined as time-difference information between the contacts of the touch-response switch which are respectively turned on when the key is depressed, wherein the time-difference information corresponds to the key-depression speed.

When performing the key scaling to key-touch responses, the conventional technology suffers from some disadvantages described above. For this reason, the conventional technology fails to think out the design of the keyboard assembly which is suitable for performing the key scaling to key-touch responses and which can be actually manufactured in a factory. And the design of the keyboard assembly should be made on the ground that manufacturing cost and assembling cost should be reduced as low as possible.

By the way, some proposals are made to manufacture the keyboard assembly for the electronic musical instrument providing the key-touch scaling mechanism. For example, key scaling is performed with respect to a distance between a supporting point of a hammer and a supporting point of a key in the keyboard assembly providing multiple hammers; key scaling is performed with respect to a distance between a tip-edge portion and a supporting point of a key; and key scaling is performed with respect to a distance between a supporting point of a key and a rubber switch. In the meantime, certain technology, by which same "touch pressure" (i.e., static reaction to a depression of key) is employed for both of white and black keys of the keyboard at their tip-edge portions, had been conventionally known. Herein, same touch response is set for each of the white key and black key by making an effecting point between the white key and its hammer different from an effecting point between the black key and its hammer.

Even the third proposal by which the key scaling is performed with respect to the distance between the supporting point of the key and the rubber switch suffers from the aforementioned disadvantages. In addition, the third proposal may result in complicated arrangement for the switches, complicated structure for wiring patterns, complicated structure for a substrate, complicated structure for a keyboard frame and complicated structure for a mechanism or member for fixing the switches, all of which will reduce productivity in manufacturing the keyboard assembly. Hence, this proposal does not work in practice.

Moreover, many proposals are made to manufacture a key-return spring in a comb-like structure which is formed as one member. In addition, some proposals are made to manufacture a multi-stage structure for a spring-terminating portion of a key and to use resin formation for a spring bearing.

The above-mentioned proposal, by which the key-return spring is manufactured in the comb-like structure, does not consider about the key scaling to key-touch responses. Further, such comb-like structure is disadvantageous because the key-return spring, after being used for a long period of time, may become wobbly; and such structure is disadvantageous because of low efficiency in equipping the keyboard assembly with the key-return spring. In addition, another proposal, by which the spring-terminating portion of the key is manufactured in the multi-stage structure and the spring bearing is formed using the resin material, is not made under the consideration of the key scaling by which the key-touch responses are altered between the keys belonging to the high-pitch division and low-pitch division respectively. Or this proposal may result in occurrence of noises by the spring; or this proposal may result in low efficiency in making the keyboard assembly.

SUMMARY OF THE INVENTION

It is an object of the present invention to provide a keyboard assembly which is suitable for the electronic musical instruments and which provides a mechanism performing a key scaling to key-touch responses with a simple structure.

It is another object of the present invention to provide a keyboard assembly, for the electronic musical instruments, which is improved in efficiency of making the keyboard assembly.

It is a further object of the present invention to provide a keyboard assembly which provides both of a static key-touch response and a dynamic key-touch response simulating motions of an action mechanism of an acoustic piano.

The present invention provides a keyboard assembly for an electronic musical instrument which comprises at least a plurality of keys, a key support member and a plurality of key-return springs. The key support member rotatably supports the keys; and the key-return spring is provided between the key and key support member so as to press up the key to a normal position. Mechanical parameters which affect a key scaling to key-touch responses of the keys are sizes, shapes and locations of parts of the keyboard assembly. For example, weight of the key is adjusted using a deadweight member so as to provide a specific key-touch response for the key. An amount of elastic resilience, made by the key-return spring, is adjusted by changing at least one location, at which one end of the key-return spring is terminated, so as to provide a specific key-touch response for the key. Viscous resistance, made by viscous material, such as grease, which is provided between a selected portion of the key and some member, such as a key guide and a support-point member, is adjusted by changing shape and/or size of that member, so as to provide a specific key-touch response for the key.

Incidentally, the key scaling is performed by changing the key-touch response with respect to each of the keys; or the key scaling is performed by changing the key-touch response with respect to a selected division of the keyboard.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENTS

Now, preferred embodiments of the present invention will be described in detail with reference to the drawings wherein parts equivalent to those shown in some drawings will be designated by the same numerals; hence, the description thereof will be sometimes omitted.

[A] First Embodiment

Figure 1:
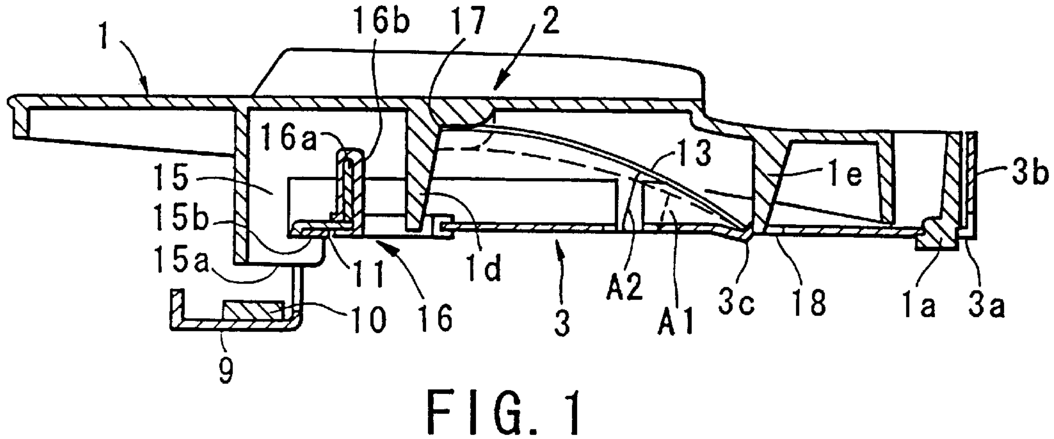
FIG. 1 is a cross-sectional view illustrating a structure of a keyboard assembly, used for the electronic musical instrument, which is designed in accordance with a first embodiment of the present invention.
Figure 2:
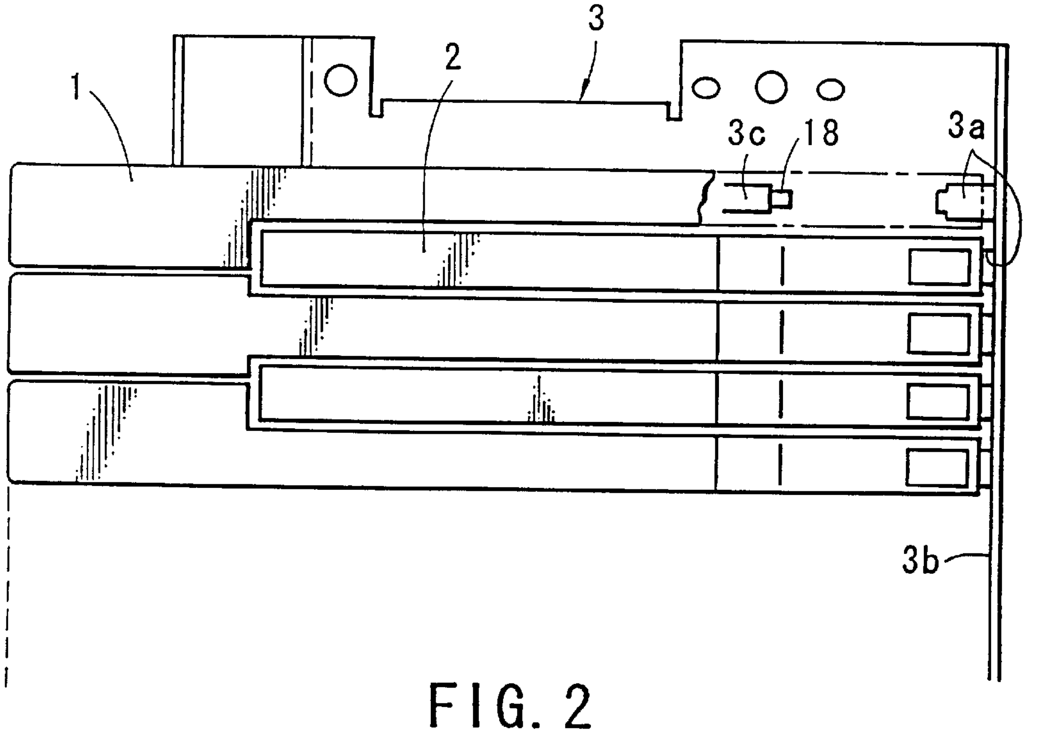
FIG. 2 is a plan view illustrating a part of an appearance of the keyboard assembly of FIG. 1.

FIG. 1 is a cross-sectional view of a keyboard assembly, which is designed in accordance with a first embodiment of the present invention, wherein a horizontal direction matches with a longitudinal direction of keys. FIG. 2 is an upper view showing a part of an appearance of the keyboard assembly of FIG. 1. Herein, white keys (each designated by a numeral '1') and black keys (each designated by a numeral '2') are disposed in parallel on a key support member 3 in accordance with a predetermined arrangement for the keys. In fact, the white key 1 and the black key 2 are different in size; however, both of them has substantially the same structure. Hence, the description of the first embodiment will be made with respect to the white key 1 only.

A front-end portion (which is located at a performer's side) of the key support member 3, which is made by some metal material, is bent downwardly to form a lip-like end portion 9. A lower-limit stopper 10 is attached onto an upper surface of the lip-like end portion 9, while an upper-limit stopper 11 is attached to a lower surface of the key support member 3. Both of those stoppers 10 and 11 are made by felt materials. A slide-guide elements 15 project downwardly from the key 1. At an end portion of the slide-guide element 15, a bent-stopper element, having a letter 'L' like shape, is formed. A lower-edge portion 15*a* of the slide-guide element 15 comes in contact with the lower-limit stopper 10 when the key 1 is depressed down. An upper-edge portion 15*b* of the slide-guide element 15 comes in contact with the upper-limit stopper 11 when the key 1 is returned to the normal position.

After the key 1 is depressed down, the lower-edge portion 15*a* of the slide-guide element 15 moves downwardly in accordance with a depressing motion of the key 1. When the lower-edge portion 15*a* comes in contact with the lower-limit stopper 10, the depressing motion of the key 1 is stopped. Thus, the vertical position of the key 1 whose depressing motion is stopped by the lower-limit stopper 10 is defined as a lower-limit position of a key-depression stroke. When releasing the depressing force applied to the key 1, the key 1 is moved upwardly by key-return force made by a key-return spring 13, which will be described later. Then, the upper-edge portion 15*b* of the slide-guide element 15 comes in contact with the upper-limit stopper 11, so that a returning motion of the key 1 is stopped. A vertical position of the key 1 whose returning motion is stopped by the upper-limit stopper 11 is defined as an upper-limit position of the key-depression stroke.

Beneath the key 1 and in proximity to the lip-like end portion 9 of the key support member 3, a key guide 16 is provided. A width of the key guides 16 is set smaller than a distance between interior walls of the slide-guide elements 15. The key guide 16 is made by a cut-out member 16*a* which is covered by a synthetic resin member 16*b* in accordance with a so-called "out-sert formation". The cut-out member 16 is a part of the key support member 3, which is subjected to rapping mold and is stood up from the surface of the key support member 3. The key guide 16 is provided to support the key 1 in such a way that the key 1 does not swing in a lateral direction or in such a way that the key 1 is not twisted during key-depression motion and key-return motion.

At a back-end portion of the key support member 3, a through hole 3*a* is provided. A back-end portion 1*a* of the key 1 which projects downwardly from the key 1 is provided to engage with the through hole 3*a* in such a way that the back-end portion 1*a* can freely swing. A part of the back-end portion of the key support member 3 is bent and is vertically stood up to form a back-end wall 3*b*.

The key-return spring 13, which is provided in connection with each key 1, is constructed by a plate-like spring. The key-return spring 13 is located beneath the key 1 in such a way that one end thereof is terminated by a spring-terminating point 17, which is set in a base-end portion of an actuator 1*d*, while another end thereof is terminated by a spring-terminating portion 3*c*. Herein, the actuator 1*d* is provided to drive a key switch and is formed as a part of the key 1 which projects downwardly from a lower surface of the key 1. The spring-terminating portion 3*c*, having a band-like shape, is formed as a part of the key support member 3 which is subjected to press working. Operations of assembling the key-return spring 13 into the keyboard assembly as shown in FIG. 1 are as follows:

One end of the key-return spring 13 is securely located at the spring-terminating point 17, while another end is temporarily located at a tip-edge portion of a temporary terminating member 1*e*. The temporary terminating member 1*e* is formed as a part of the key 1 which projects downwardly from the lower surface of the key 1. Then, the tip-edge portion of the temporary terminating member 1*e* is inserted into a hole 18 which is made at a back portion of the spring-terminating portion 3*c*, so that another end of the key-return spring 13 is automatically located at the spring-terminating portion 3*c*. Thus, the key-return spring 13 is securely assembled into the keyboard assembly as shown in FIG. 1.

All of the key-return springs which are provided in connection with all of the keys respectively are the same in size and shape. It is clearly observed from the illustration of FIG. 1 that length of the key-return spring 13 is set longer than a straight distance between the spring-terminating point 17 of the actuator 1*d*, by which one end is terminated, and the spring-terminating portion 3*c* by which another end is terminated. Thus, all of the key-return springs are bent upwardly in a convex shape, which will yield elastic resilience. A vertical component of the elastic resilience drives the key 1 to return to the normal position.

The key scaling to key-touch responses is made by adjusting the location of the spring-terminating point 17 of the actuator 1*d*. In other words, the spring-terminating points are set slightly different from each other with respect to the keys. A dotted curve in FIG. 1 shows a change in location of the spring-terminating point 17.

According to one example of the method of performing the key scaling to key-touch responses, a shape of the actuator 1*d* is changed in such a way that as compared to location of a spring-terminating point for a key having a lower pitch, location of a spring-terminating point for a key having a higher pitch is set lower and is moved downwardly toward the tip-edge portion of the actuator 1*d*; in other words, it is moved downwardly toward the key support member 3. Thus, an angle by which the elastic resilience of the key-return spring 13 is imparted to the key 1 is changed in such a way that an angle for a key having a higher pitch is set smaller than an angle for a key having a lower pitch. Herein, the angle described above is an angle formed between a straight line, connecting both ends of key-return spring 13, and a horizontal plane of the key support member 3. Hereinafter, this angle is called a spring angle 'A'. Now, although the same elastic resilience is yielded by all of the key-return springs, vertical component thereof is different with respect to each of the key-return springs. In other words, a vertical component for a key having a higher pitch is set smaller than a vertical component for a key having a lower pitch. Thus, it is possible to gradually reduce the key-return force to the key as the pitch of the key becomes higher. Assuming two keys which are located adjacent to each other, wherein first key is higher in pitch than second key; and the first key has a spring angle 'A1' while the second key has a spring angle 'A2'. In that case, a relationship between them can be represented by an inequality as follows:

$$A1 < A2$$

Figure 4:
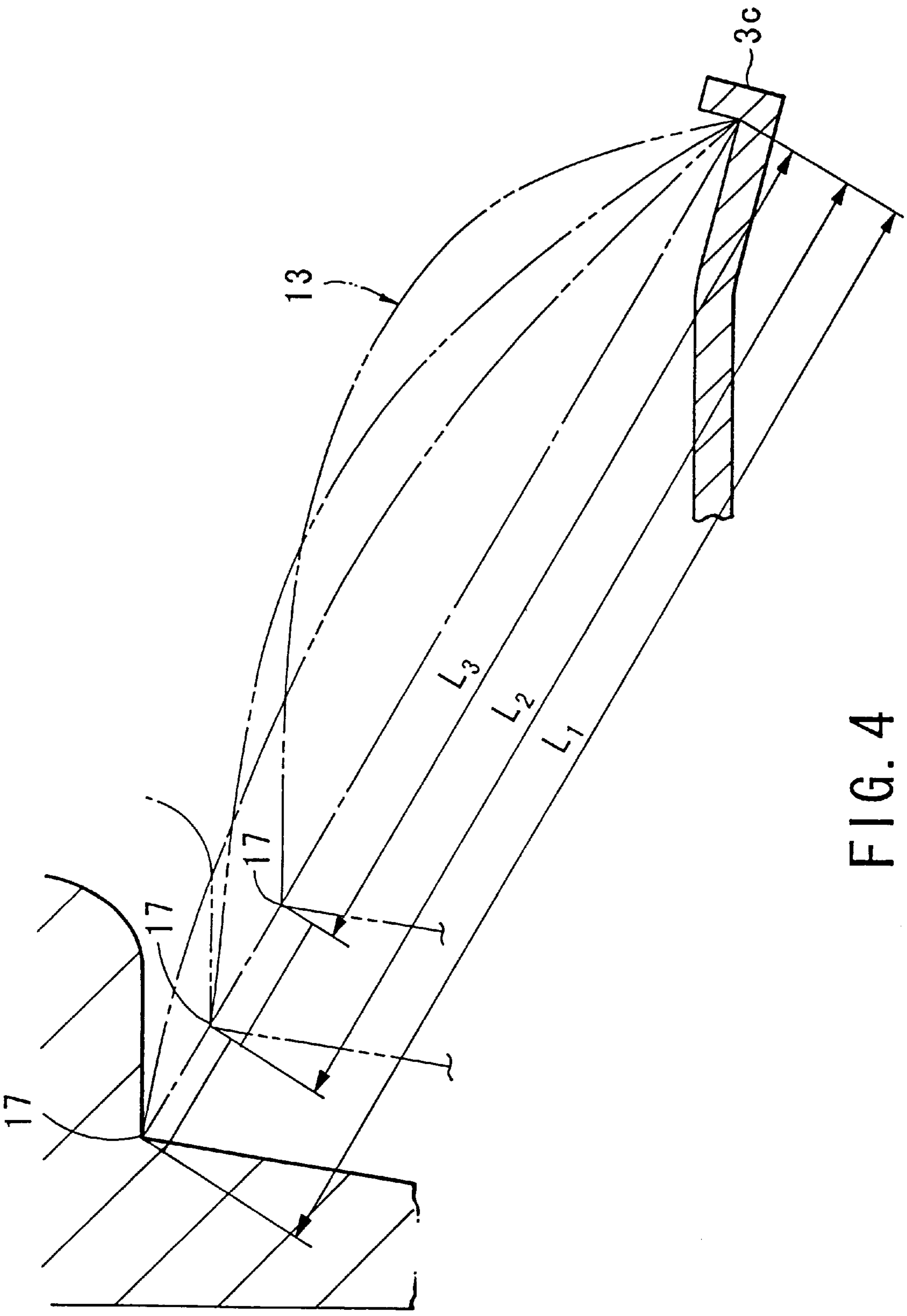
FIG. 4 is a drawing which is used to explain a method of performing the key scaling with respect to the keyboard assembly of FIG. 1.

The above method describes that key scaling is performed by changing a direction of the elastic resiliency which effects on the key 1 by the key-return spring 13. However, the key scaling can be performed by changing an amount of the elastic resilience made by each of the key-return springs with respect to each of the keys. FIG. 4 shows an example of a method of performing the key scaling responsive to a change in amount of the elastic resilience which is accomplished by changing a degree of bending of the key-return spring. Herein, shapes of the actuators are gradually changed in such a way that a straight distance 'L', between the spring-terminating point 17 and the spring-terminating portion 3*c*, is gradually changed. Specifically, the distance is made shorter as the pitch becomes lower. In FIG. 4, three different distances '$L_1$', '$L_2$' and '$L_3$' are shown, wherein the distance $L_1$ is set for a key having a highest pitch, while the distance $L_3$ is set for a key having a lowest pitch. As the distance becomes shorter, the degree of bending becomes higher. Thus, the amount of elastic resiliency is made higher as the pitch of the key becomes lower.

Each of the above-mentioned two methods can be independently employed by the keyboard assembly. Or it is possible to employ both of the methods simultaneously for the keyboard assembly. In that case, the spring angle A and the distance L can be respectively changed with respect to each of the keys; hence, the key scaling is accomplished based on a combination of the spring angle and distance changed respectively. As compared to a former case where one of the methods is selectively employed, a latter case where both of the methods are simultaneously employed is advantageous in that a variety of key-scaling manners can be accomplished based on the combination of the spring angle and distance.

As described above, the first embodiment is made based on a precondition where all of the key-return springs have the same size and same shape. And, the first embodiment is characterized by that by merely changing the spring-terminating point 17, by which one end of the key-return spring 13 is terminated, the key scaling to key-touch responses can be accomplished without providing any additional parts to the keyboard assembly.

(1) First Modified Example

Next, a first modified example of the first embodiment will be described with reference to FIG. 3, wherein parts equivalent to those of FIG. 1 will be designated by the same numerals. An illustration of FIG. 3 is reverse to that of FIG. 1.

Figure 3:
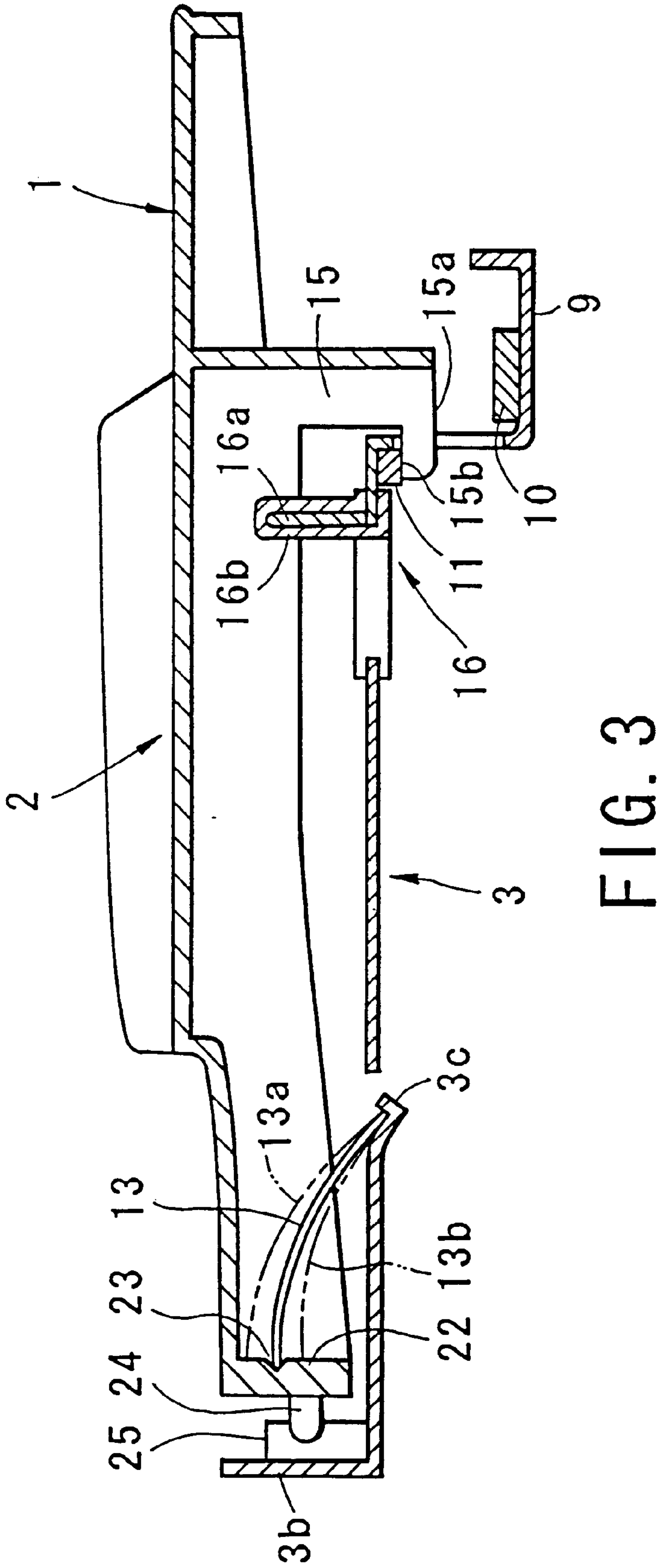
FIG. 3 is a cross-sectional view illustrating a structure of a keyboard assembly according to a first modified example of the first embodiment.

This example of FIG. 3 indicates an application of the present invention to the keyboard assembly of the type in which the key-return spring 13 extends from the key support member 3 to a supporting point for swing motion of a key.

The key 1 has a back-end portion 22; and a supporting-point member 24 projects from the back-end portion 22. This supporting-point member 24 engages with a recess of a supporting-point bearing member 25 which is attached to the back-end wall 3*b* of the key support member 3, so that the key 1 and the key support member 3 are assembled together in such a way that the key 1 can freely rotate or swing about the supporting-point member 24. One end of the key-return spring 13 engages with a spring-terminating recess 23 which is formed at an interior wall of the back-end portion 22 of the key 1, so that the one end of the key-return spring 13 is terminated and is securely fixed. As similar to the foregoing first embodiment of FIG. 1, another end of the key-return spring 13 is terminated by the spring-terminating portion 3*c* of the key support member 3. A location of the spring-terminating recess 23 is changed in a vertical direction by every key, by every half octave or by every one octave. Thus, in FIG. 3, the degree of bending of the key-return spring is changed as shown by one-dashed line 13*a* or as shown by two-dashed line 13*b*. A change in location of the spring-terminating recess 23 by which one end of the key-return spring 13 is terminated results in a change in vertical component of the elastic resiliency of the key-return spring 13. Therefore, the modified example of FIG. 3 can perform the key scaling to key-touch responses as similar to the aforementioned first embodiment of FIG. 1. Incidentally, a rotation structure of the key 1 and a construction of the key guide 16 are not limited by the illustration of FIG. 3.

(2) Second Modified Example

Figure 5:
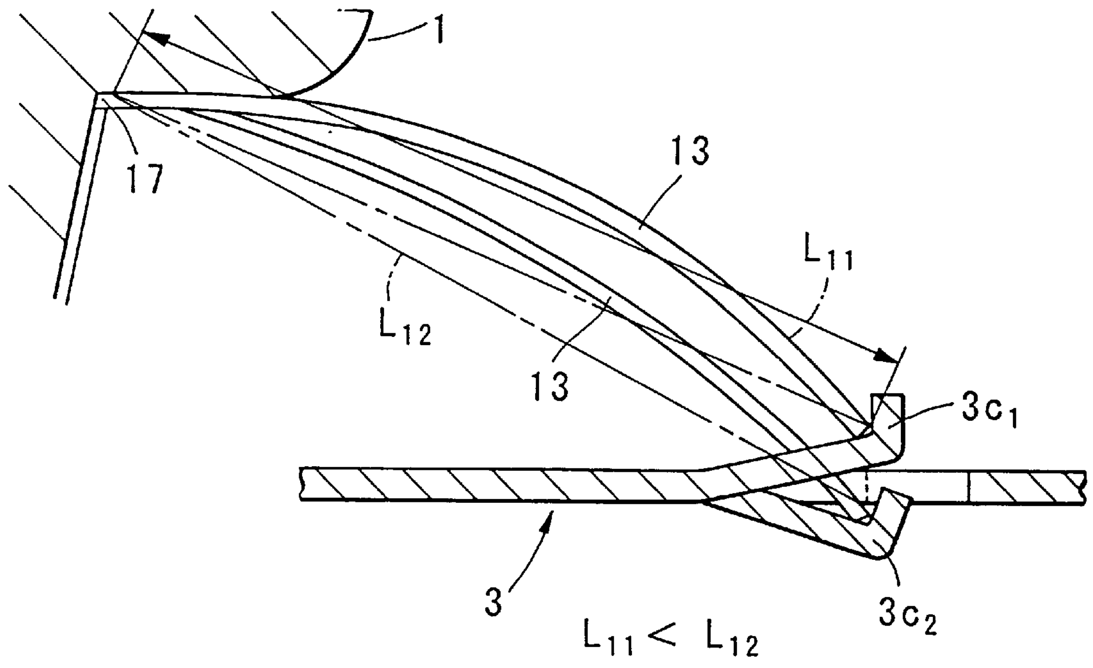
FIG. 5 is a drawing showing a part of a keyboard assembly according to a second modified example of the first embodiment.

The keyboard assemblies as shown by FIGS. 1 and 3 are both made based on a design principle in which a terminating location for one end of the key-return spring 13 is changed with respect to the key 1 so as to accomplish the key scaling to key-touch responses. However, it is possible to employ another design principle as well, by which a terminating location for another end of the key-return spring 13 is changed with respect to the key support member 3. The second modified example, as shown by FIG. 5, is designed in such a way that the location of the spring-terminating portion 3*c* of the key support member 3, by which another end of the key-return spring 13 is terminated, is changed to offer a variation to the key scaling to key-touch responses. Herein, a variety of spring-terminating portions, such as a first spring-terminating portion 3$c_1$ and a second spring-terminating portion 3$c_2$, are provided with respect to each key or with respect to each group of keys. As compared to a horizontal plane of the key support member 3, the first spring-terminating portion 3$c_1$ is bent upwardly, while the second spring-terminating portion 3$c_2$ is bent downwardly. Thus, another end of the key-return spring 13 is terminated by one of those spring-terminating portions in accordance with a predetermined rule. In addition, a bent location of each spring-terminating portion is adjusted as well. According to the second modified example of FIG. 5, even if the terminating location for one end of the key-return spring 13 is fixed, the terminating location for another end of the key-return spring 13 can be changed. Herein, a distance '$L_{11}$' appears between a fixed terminating location and the first spring-terminating portion 3$c_1$, while a second distance '$L_{12}$' appears between the fixed terminating location and the second spring-terminating portion 3$c_2$, wherein $L_{11}<L_{12}$. When the terminating location for another end of the key-return spring 13 is changed from '3$c_1$' to '3$c_2$', the distance is increased from '$L_{11}$' to '$L_{12}$'. In that case, component of force effected on the rotation of the key 1 is changed; and the key-return force effected on the key 1 when being returned to the normal position is reduced as well. As compared to the first modified example of FIG. 3, the second modified example of FIG. 5 is advantageous in that a variety of combinations of the terminating locations for both ends of the key-return spring can be used. In other words, a variety of terminating locations for another end of the key-return spring can be used with respect to one terminating location for one end of the key-return spring so that a variety of key-touch responses can be set for each of the keys. In the aforementioned keyboard assembly of FIGS. 1 and 3, each of the keys should be constructed differently because the spring-terminating point 17, which is located at a lower portion of the key, should be changed with respect to each of the keys. In other words, such keyboard assembly requires different types of keys. In contrast, the second modified example is designed to merely changing the spring-terminating portion 3*c* of the key support member 3. Thus, the second modified example merely require one type of key, by which cost for manufacturing the keyboard assembly can be reduced.

Further, it is possible to freely combine the location of the spring-terminating recess 23 with either the spring-terminating portion 3$c_1$ or the spring-terminating portion 3$c_2$. Thus, it is possible to accomplish a variety of manners in the key scaling to key-touch responses. In short, all of the examples described before are combined together to offer three means for the key scaling to key-touch responses, as follows:

(a) first means, by which the spring-terminating point 17 in FIG. 1 is moved in a vertical direction;

(b) second means, by which a straight distance, in FIG. 4, between the terminating locations for both ends of the key-return spring is changed; and (c) third means, by which the terminating location, in FIG. 5, for another end of the key-return spring is changed. By adequately using one of those means or by adequately combining two of or all of those means, the present invention can offer a variety of manners in the key scaling to key-touch responses; in other words, it is possible to obtain a desired manner in the key scaling to key-touch responses.

(3) Third Modified Example

Next, the third modified example will be described with reference to FIGS. 6A to 6D. The third modified example is designed in connection with the second modified example. The third modified example offers a variety of terminating locations for the key-return spring 13 with respect to the key 1 and with respect to the key support member 3. Combinations between those terminating locations are used to accomplish a variety of manners in the key scaling to key-touch responses.

Figure 6A:
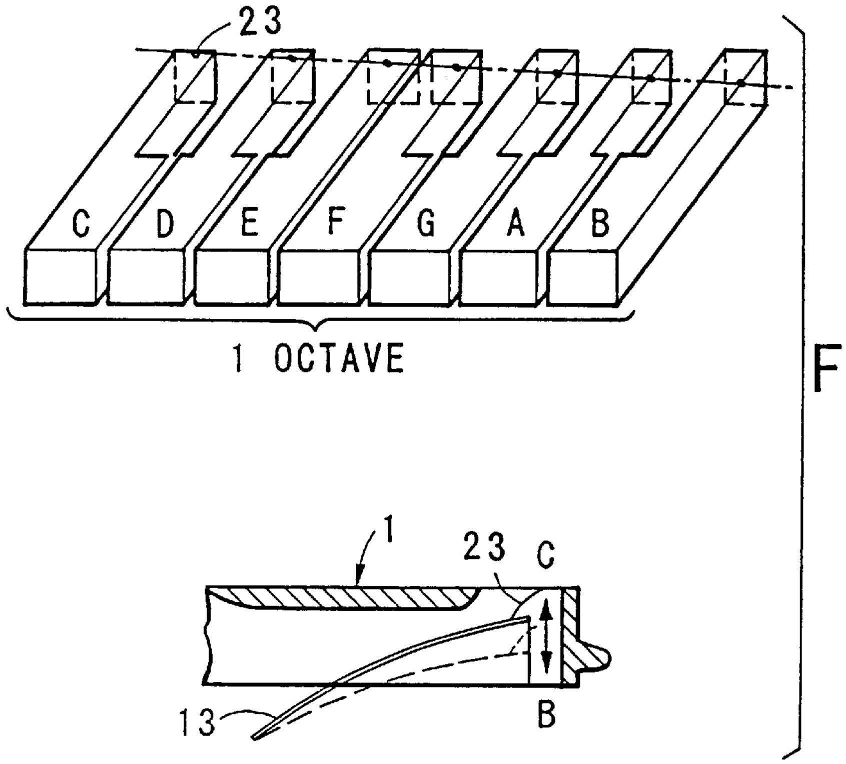
FIGS. 6A to 6D are drawings showing a structure of a keyboard assembly according to a third modified example of the first embodiment.

As for the white keys of the keyboard, one octave consists of notes C, D, E, F, G, A and B in scale of C major. One metal mold is provided for one-octave section of the keyboard. Thus, an overall area of the keyboard is made by a variety of metal molds. The metal mold for one-octave section between the notes C and B is formed in such a way that the spring-terminating recess 23 for each key is gradually changed as shown by FIG. 6A. Thus, seven different spring-terminating points are provided for seven white keys In the one-octave section of the keyboard, wherein the key-return spring as shown by a full line in FIG. 6A is provided for a key of the note C, while the key-return spring as shown by a dotted line in FIG. 6A is provided for a key of the note B. The similar change in the spring-terminating point is provided for each of five black keys in the one-octave section of the keyboard; however, the illustration thereof is omitted in FIG. 6A. In addition, the present example provides two stages in the location of the spring-terminating portion 3*c*, wherein the two stages are different in location from each other in the longitudinal direction of the key 1. Further, the present example provides two stages in the degree of vertical bending of the spring-terminating portion 3*c* as shown by FIGS. 6C and 6D. Thus, the seven spring-terminating points for the seven white keys together with the five spring-terminating points for the five black keys are adequately combined with the two stages in the location of the spring-terminating portion 3*c* as well as the two stages in the degree of vertical bending of the spring-terminating portion 3*c*. As a result, it is possible to obtain a variety of combinations, in the key scaling to key-touch responses, the number of which is calculated as follows:

$$12\times2\times2$$

Figure 6B:
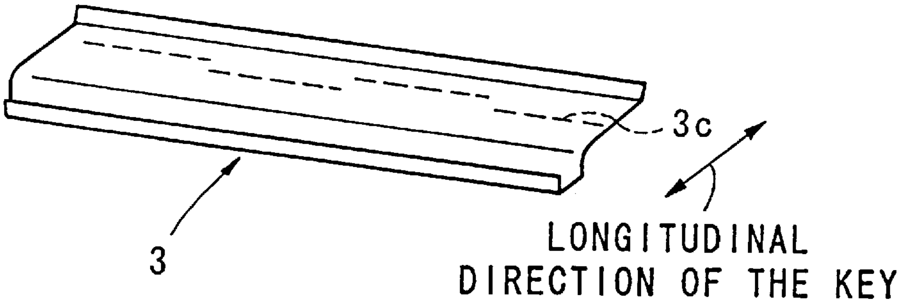
Figure 6C:
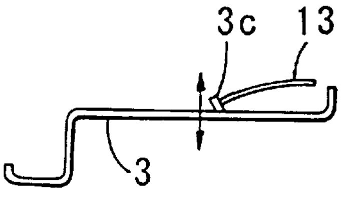
Figure 6D:
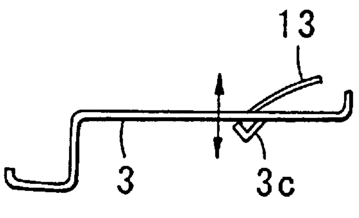
Figure 7:
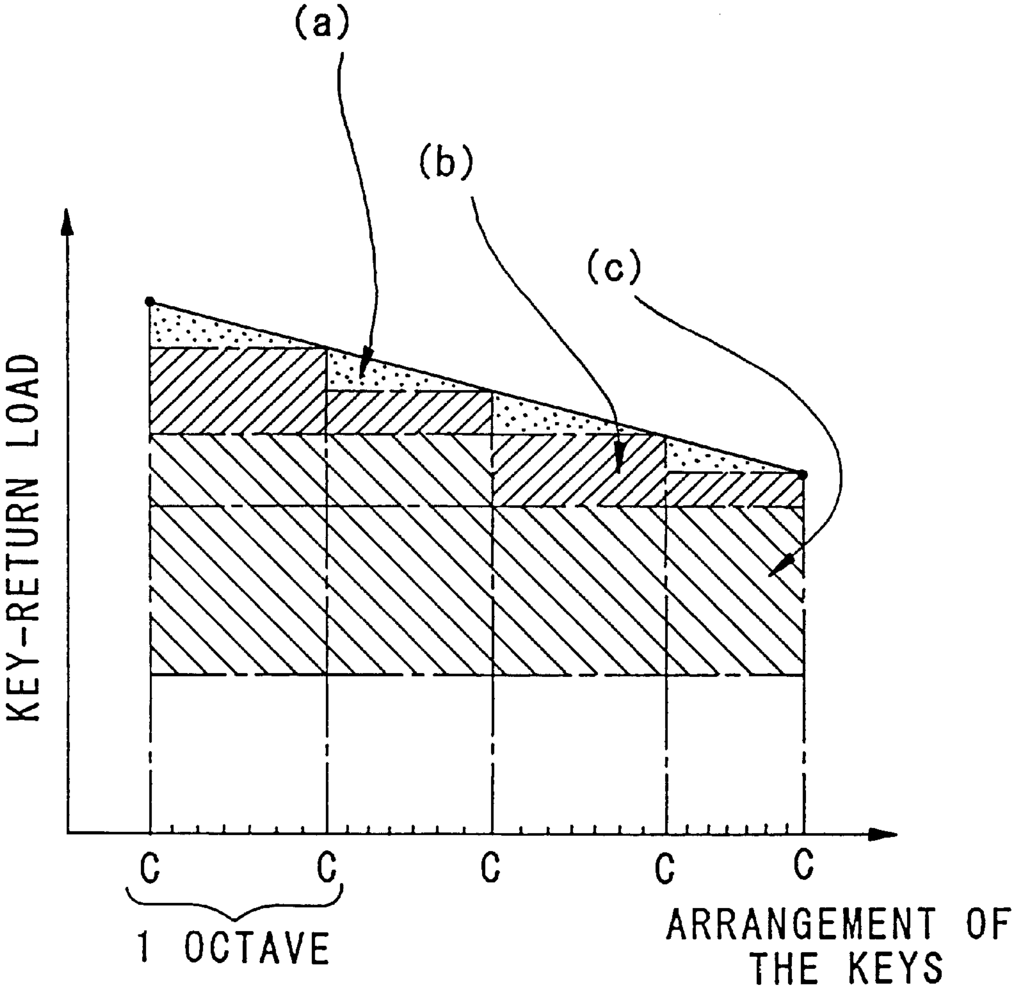
FIG. 7 is a graph showing a way how the third modified example of FIGS. 6A to 6D improves key scaling with respect to key-return load.

In short, the present example offers three means for the key scaling to key-touch responses, as follows:

(a) first means of FIG. 6A, by which the spring-terminating recess 23 is changed with respect to each of the keys;

(b) second means of FIG. 6B, by which the spring-terminating portion 3*c* is changed in the two stages with respect to one-octave section of the keyboard; and (c) third means of FIGS. 6C and 6D, by which the degree of vertical bending of the spring-terminating portion 3*c* is changed in the two stages with respect to each of the keys. The effects, respectively made by first, second and third means, to key-return load are shown by (a), (b) and (c) in FIG. 7. The total number of stages for the key scaling in terms of the construction of the keyboard assembly is calculated as follows:

$$12+2+2=16$$

In contrast, the total number of stages for the key scaling in terms of the combination of the elements (e.g., the spring-terminating point 17 and the spring-terminating portion 3*c*) to adjust the key-return spring is calculated as follows:

$$12\times2\times2$$

Thus, by adequately changing the location of the spring-terminating point 17 as well as the location and/or degree of vertical bending of the spring-terminating portion 3*c*, it is possible to set a variety of key-return loads with ease. Perhaps, the conventional technology may offer a variety of manners in the key scaling to key-touch responses by providing a complicated construction for the keyboard assembly, in which a variety in kinds of the key switches, each having a reversed-cup-like shape, are provided, for example. Such complicated construction may cause a confusion in assembling the parts of the keyboard assembly; and it may require a complicated countermeasure to eliminate the confusion. However, the present example does not require such complication construction as well as such complicated countermeasure. Hence, the present example is useful.

As described above, the present example performs a key scaling to key-touch responses with respect to each set of the keys of the keyboard. As a result, the present example can perform a certain number of stages for the key scaling, as follows:

$$TK=SK\times SS$$

where 'TK' represents a total number of stages of the key scaling with respect to the keyboard assembly as a whole; 'SK' represents a number of stages of the key scaling with respect to the keyboard only; and 'SS' represents a number of stages of the key scaling with respect to the key support member. Thus, as compared to the keyboard assembly which requires different types of the keys, this example can provide a simple construction of the keyboard assembly which requires one type of the key.

(4) Other Modification

All of the examples concerning the first embodiment describe an application of the present invention in which the key scaling to key-touch responses is performed on the key which does not provide any body of mass such as a hammer. However, the present invention is not limited to such an application. The present invention is applicable to the keyboard assembly, providing the body of mass such as the hammer, which is disclosed by the paper of U.S. Pat. No. 4,901,614, for example.

The above keyboard assembly disclosed by U.S. Pat. No. 4,901,614 is characterized by providing one restoration spring which shares function of the key-return spring as well as function of a hammer-return spring; however, this keyboard assembly does not employ a key scaling to key-touch responses. Herein, the restoration spring is fixed between the hammer and the key in proximity to the supporting point of the key. If this keyboard assembly is re-designed to perform a key scaling to key-touch responses, fixed points of the restoration spring are changed adequately so as to change elastic resilience with respect to each of the keys.

[B] Second Embodiment

Figure 8:
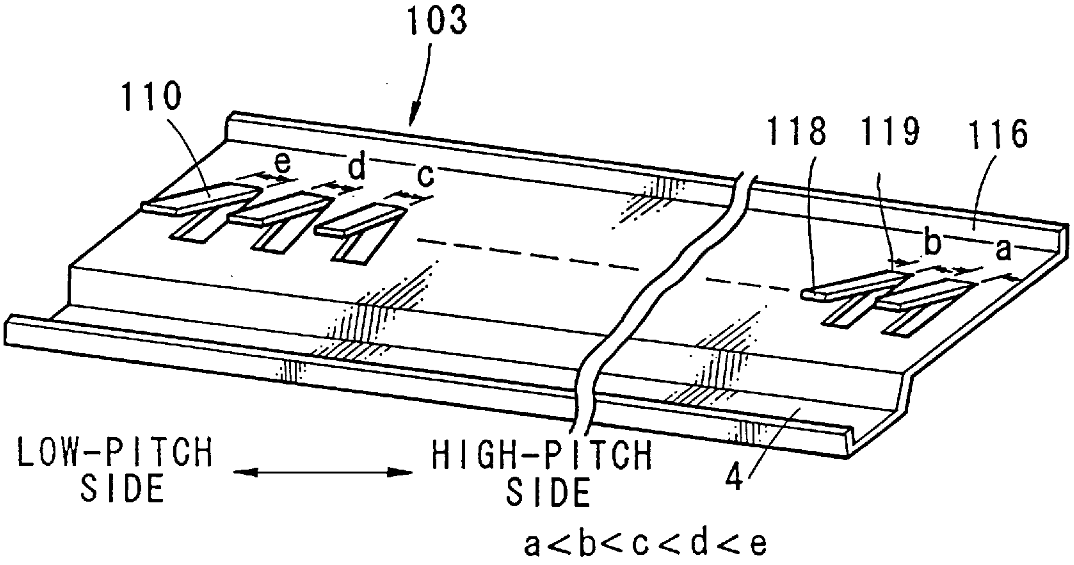
FIG. 8 is a perspective view illustrating an appearance of a key support member used by a keyboard assembly according to a second embodiment of the present invention.
Figure 9:
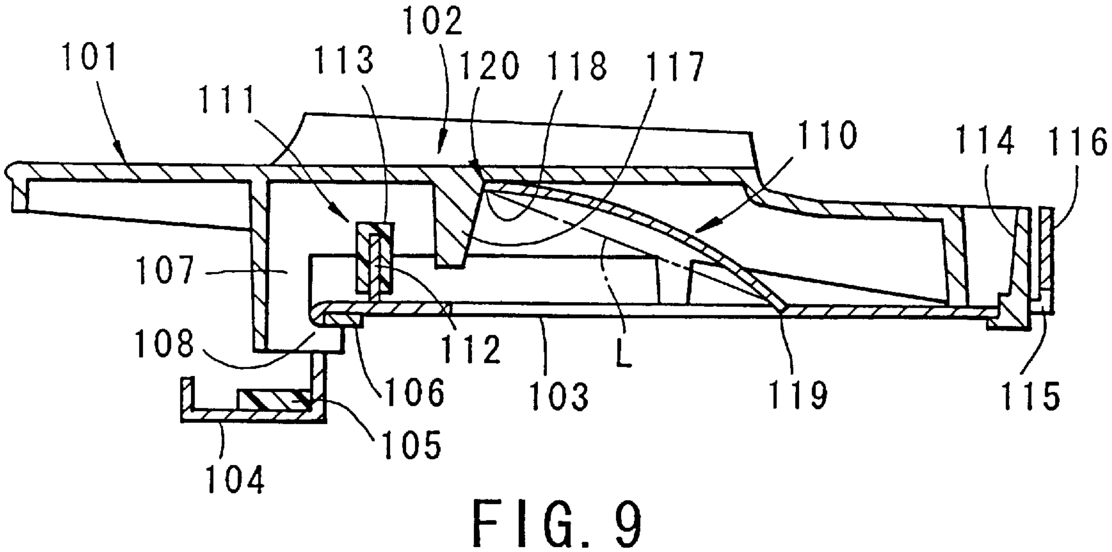
FIG. 9 is a cross-sectional view illustrating a structure of the keyboard assembly of the second embodiment.

Now, a keyboard assembly according to a second embodiment of the present invention will be described with reference to FIGS. 8 and 9. FIG. 8 is a perspective view illustrating an appearance of a key support member 103 used by the keyboard assembly of the second embodiment; and FIG. 9 is a cross-sectional view illustrating a construction of the keyboard assembly of the second embodiment. Herein, a white key 101 and a black key 102 are rotatably supported by the key support member (called a keyboard frame or the like).

A front-end portion of the key support member 103 is bent downwardly to form a lip-like end portion 104. A lower-limit stopper 105 and an upper-limit stopper 106, each of which is made by the felt materials, are respectively attached to the key support member 103. Specifically, the lower-limit stopper 105 is attached onto an upper surface of the lip-like end portion 104, while the upper-limit stopper 106 is attached to a lower surface of the key support member 103 near its bent position. A slide guide element 107 projects downwardly from a lower surface of the key 101. And an end portion of the slide guide element 107 is bent in a letter 'L' like shape to form a bent stopper element 108.

When the key 101 is depressed down, the key 101 is moved downwardly. When a lower surface of the bent stopper element 108 of the slide guide element 107 comes in contact with the lower-limit stopper 105, a key-depression motion is stopped; therefore, a vertical position of the key 101 at which the key-depression motion is stopped is defined as a lower-limit position in a key-depression stroke of the key 101. When the depression to the key 101 is released, a key-return spring 110 presses the key 101 upwardly. When an upper surface of the bent stopper element 108 comes in contact with the upper-limit stopper 106, a key-return motion is stopped; therefore, a vertical position of the key 101 (see FIG. 9) at which the key-return motion is stopped is defined as an upper-limit position in the key-depression stroke of the key 101.

A key guide 111, whose width is smaller than a distance between interior walls of the slide-guide elements 107, is provided on the key support member 103 at a position in proximity to the lip-like end portion 104. Like the aforementioned key guide 16 in FIG. 1, the key guide 111 is made by covering a cut-out portion 112 with a synthetic-resin member 113.

At a back-end portion of the key support member 103, a through hole 115 is formed, in which a part of a back-end portion of the key 101 is inserted. Thus, the key 101 is supported by the key support member 103 in such a way that the key 101 can freely rotate up and down about a supporting point which is formed at a contact point between the through hole 115 and the back-end portion 114 of the key 101. A part of the back-end portion of the key support member 103 is bent and is vertically stood up to form a back-end wall 116. Incidentally, FIG. 8 omits illustration for the through holes 115 and the cut-out portions 112.

The second embodiment is characterized by that the key support member 103 is subjected to press working to form the key-return springs (e.g., 110) as shown by FIG. 8. Hence, each key-return spring is formed by using a part of the key support member 103. FIG. 1 shows that a set of key-return springs are disposed on the key support member 103, wherein each of the key-return springs is provided for each of the keys. Each key-return spring is formed by bending upwardly a cut part of the key support member 103. Widths of the key-returns springs are changed in such a way that they are reduced in a pitch-ascending order; in other words, a width of a key-return spring corresponding to a key having a higher pitch is set smaller than a width of a key-return spring corresponding to a key having a lower pitch. Such reduction to the widths of the key-return springs is made with respect to each key or with respect to each division of the keys. For example, the same width is set for multiple key-return springs and is reduced by every three or four keys, by every half-octave or by every one octave. Or it is reduced by every section of melody keys or by every section of accompaniment keys. In short. the widths of the key-return springs are changed in a step-by-step manner by controlling the press working. Thus, a spring constant is changed with respect to each key-return spring; or the same spring constant is set for multiple key-return springs and is changed with respect to each set of the multiple key-return springs.

As shown in FIG. 9, a tip-edge portion 118 of the key-return spring 110 is terminated by a spring supporting member 117 which projects downwardly from the lower surface of the key 101, while a base portion 119 of the key-return spring 110 is formed together with the key support member 103. A length of the key-return spring 110 is set longer than a straight distance 'L' between the tip-edge portion 118 and the base portion 119. By terminating the tip-edge portion by means of the spring supporting member 117, each key-return spring is bent upwardly in a convex shape, thus yielding elastic resilience. Due to the elastic resilience of the key-return spring 110, the key 101 is pressed upwardly to the normal position. Key-return force corresponding to an amount of elastic resilience of the key-return spring is changed responsive to the spring constant. Specifically, the key-return force is gradually reduced in a pitch-ascending order by every key or by every set of the keys. In other words, key-return force imparted to a key having a higher pitch is set smaller than key-return force imparted to a key having a lower pitch. Thus, it is possible to effect a key scaling to key-touch responses in such a way that a key-touch response to a key having a lower pitch is relatively "heavy" while a key-touch response to a key having a higher pitch is relatively "light".

The second embodiment is originally designed in such a way that the key-touch response is changed with respect to each key (or with respect to each set of the keys) by changing the width of the key-return spring (or by changing the width for the key-return springs). Instead, the second embodiment can be modified in such a way that a bending angle between the key-return spring and a horizontal plane of the key support member 103 is adjusted by adjusting a manner of press working. Or the second embodiment can be modified in such a way that the length of the key-return spring is gradually increased in a pitch-ascending order by adjusting a press mold.

Figure 10:
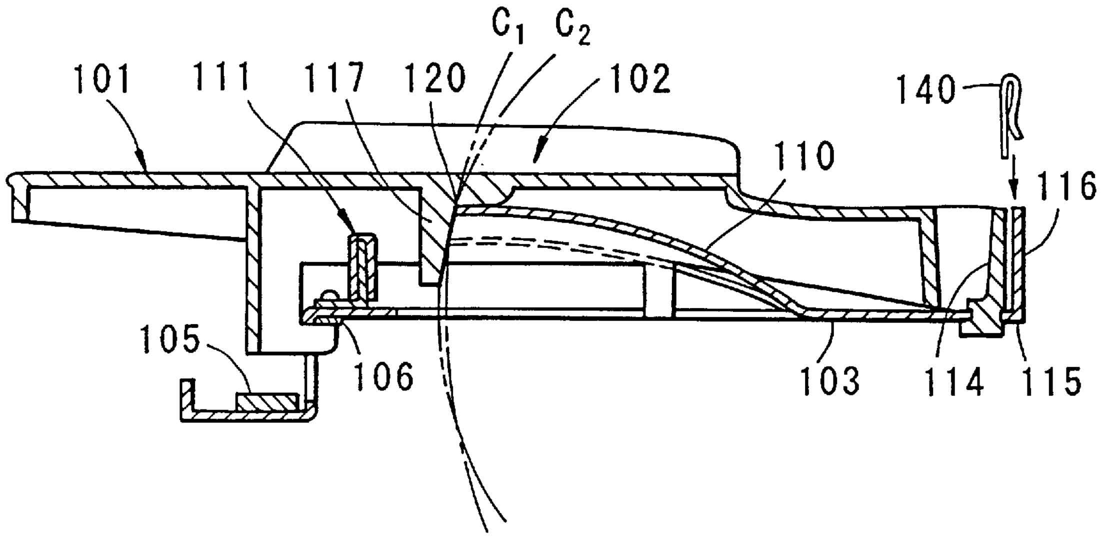
FIG. 10 is a cross-sectional view illustrating a structure for a modification of the keyboard assembly of the second embodiment.
Figure 11:
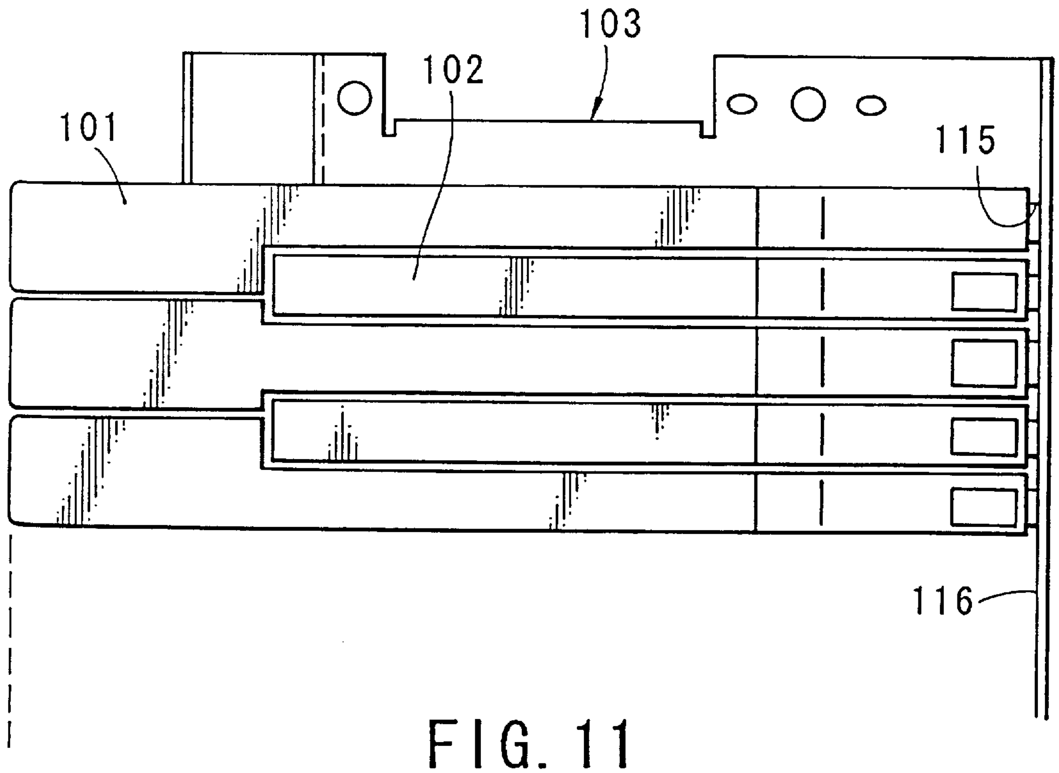
FIG. 11 is a plan view illustrating a part of an appearance of the keyboard assembly of FIG. 10.

FIGS. 10 and 11 show a modified example of the keyboard assembly according to the second embodiment shown by FIGS. 8 and 9. FIG. 10 is a cross-sectional view and FIG. 11 is a plan view showing a part of an appearance of the keyboard assembly of the modified example. The tip-edge portion of the key-return spring 110 is terminated by a spring-terminating portion 120 of the spring support member 117. In the modified example, a location of the spring-terminating portion 120 is changed with respect to each of the keys, so that the elastic resilience made by the key-return spring is changed with respect to each of the keys. In FIG. 10, a one-dashed line $C_1$ shows a locus along which the spring-terminating portion 120 is moved in response to a depression of the key 101, while a two-dashed line $C_2$ shows a locus along which the tip-edge portion of the key-return spring 110 is moved in response to the depression of the key 101. A fall avoiding member 140 is fastened to the back-end wall 116 so as to avoid a falling of the key 101 when the key 101 is rotatably moved. Such fall avoiding member 140 can be applied to the keyboard assembly of FIG. 9 as well. A construction for charging the location of the spring-terminating portion 120 can be used for adjusting a reaction, effected between the white key and black key, in such a way that the same reaction is effected at the tip-edge portion of each of those keys, for example. In FIG. 10, full lines show the key-return spring 110 for the white key, while dotted lines show a key-return spring for the black key.

As for the white key 101 and the black key 102 which are located adjacent to each other, it is preferable that the same key-touch response is accomplished at the tip-edge portion of each of those keys. In order to do so, it may be needless to adjust a difference between a moment of the white key 101 and a moment of the black key 102; but it is preferable to adjust spring constants in such a way that a spring constant of a key-return spring for the white key 101 is set larger than a spring constant of a key-return spring for the black key 102. Herein, the key-return spring provided for the white key 101 is called a "white-key spring", while the key-return spring provided for the black key 102 is called a "black-key spring". In order to do so, a variety of manners of adjustment (a) to (c) for changing the spring constants of those keys can be applied to the modified example as well as the second embodiment.

(a) To change a width of the key-return spring in such a way that a width of the white-key spring is increased, while a width of the black-key spring is decreased.

(b) To change an angle between the key support member 103 and the key-return spring in such a way that an angle for the white-key spring is made larger, while an angle for the black-key spring is made smaller.

(c) To change a length of the key-return spring in such a way that a length of the white-key spring is made shorter, while a length of the black-key spring is made longer.

Figure 12:
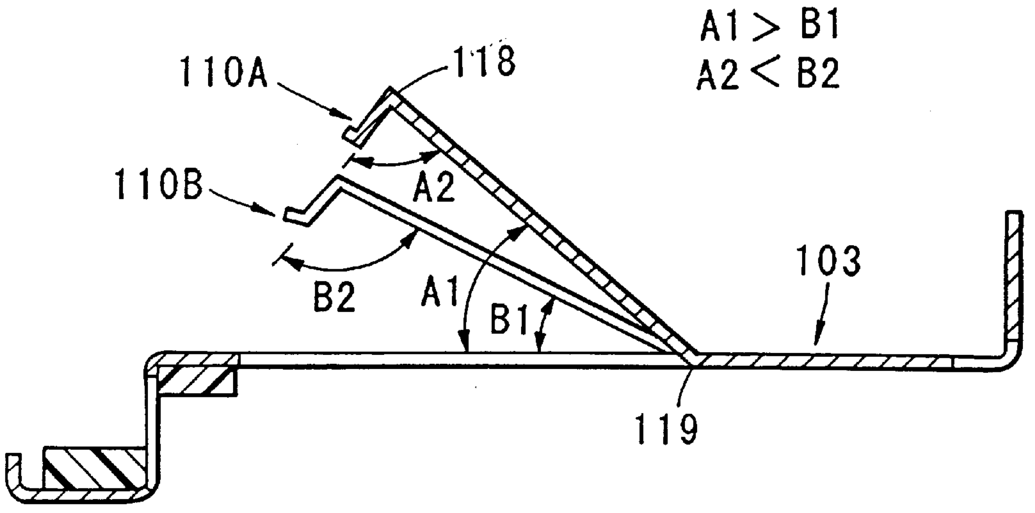
FIG. 12 is a side view illustrating an essential part for another modification of the keyboard assembly of the second embodiment.

FIG. 12 shows one modified example, which is provided for an electronic musical instrument providing melody keys (i.e., keys for a high-pitch range) and accompaniment keys (i.e., keys for a low-pitch range). This example is designed to accomplish a key scaling to key-touch responses with respect to each of the melody keys and accompaniment keys. In order to do so, the key scaling is performed by changing an angle between the key support member 103 and the key-return spring 110 under the condition where the same width is set for all of the key-return springs or under the condition where one same width is set for all of the white-key springs and another same width is set for all of the black-key springs. In FIG. 12, a key-return spring 110A is provided for an accompaniment key, wherein an angle A1 is formed between the key-return spring 110A and the key support member 103; and a key-return spring 110B is provided for a melody key, wherein an angle B1 is formed between the key-return spring 110B and the key support member 3. Herein, the angle B1 for the melody key is smaller than the angle A1 for the accompaniment key.

Moreover, tip-edge portions of the key-return springs 110A and 110B are bent by angles A2 and B2 respectively by effecting bending process. Herein, the angle A2 for the bent tip-edge portion of the key-return spring 110A is smaller than the angle B2 for the bent tip-edge portion of the key-return spring 110B. The spring-terminating portion 120 of the spring support member 117 has a form which specifically engages with the corresponding key-return spring. In order to perform a key scaling in a step-by-step manner, an adjustment to the angle of the spring-terminating portion is made in a step-by-step manner. Each of the key-return springs 110A and 110B is securely terminated by the corresponding spring-terminating portion. Thus, both of the melody key and accompaniment key which correspond to the same pitch can be formed using the same metal mold. Further, it is possible to avoid an error in assembling each of the key-return springs 110A and 110B together with the corresponding spring support member.

The angle A2 is set in such a way that the bent tip-edge portion of the key-return spring 110A coincides with a tangential line of a circle which is drawn about a center of circle corresponding to the base portion 119. Herein, a radius of the circle corresponds to a distance between a bent corner 118 and the base portion 119; and the angle A2 is set in a range between 80° and 90°, for example. The tip-edge portion of the key-return spring 110B is bent in such a way that the angle B2 is set to meet an inequality of "B2>A2". Thus, a certain angle relationship is established for the key-return springs 110A and 110B to meet inequalities of "A2<B2" and "B1<A1". Thanks to the angle relationship established, a location at which each of the key-return springs 110A and 110B should be assembled can be certainly set. If the key-return spring is assembled at a wrong location, a manner of terminating the key-return spring becomes unnatural; in other words, a part of the bent tip-edge portion of the key-return spring is deviated from the location at which the key-return spring should be assembled. Due to such unnaturality, it is possible to easily judge as to whether or not the key-return spring fits with the spring support member.

(1) First Modified Example

Figure 13:
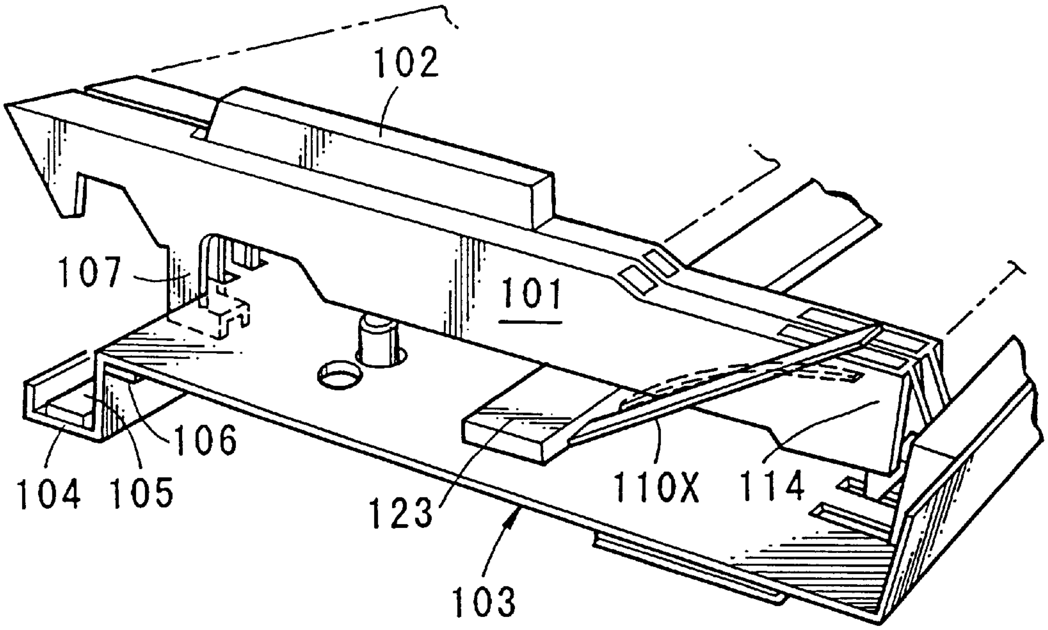
FIG. 13 is a perspective view illustrating a structure of a keyboard assembly according to a first modified example of the second embodiment.
Figure 14:
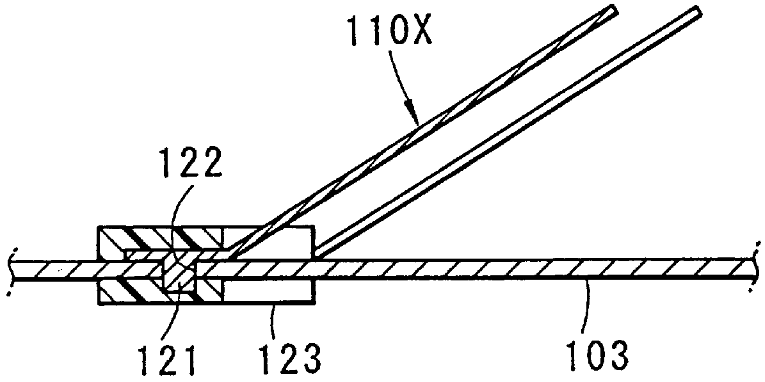
FIG. 14 is a side view illustrating an essential part of the keyboard assembly of FIG. 13.
Figure 15:
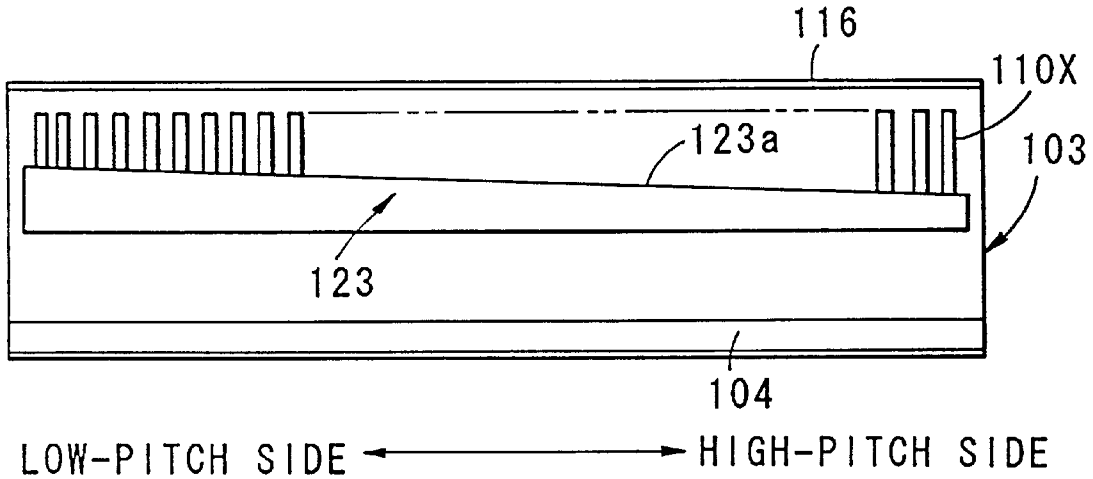
FIG. 15 is a plan view illustrating an appearance of a comb-like key-return-spring member '110X' which is attached to the key support member of the keyboard assembly of FIG. 13.

A first modified example of the second embodiment is shown by FIGS. 13 to 15. In the second embodiment of FIG. 10, the key-return spring 110 is formed by a part of the key support member 103. In contrast to the second embodiment, the first modified example is designed such that a set of key-return springs are formed by an independent member, called key-return-spring member 110X, which is fixed to the key support member 103. The key-return-spring member 110X has a comb-like shape having multiple teeth each of which acts like a key-return spring provided for each of the keys, wherein each tooth is formed like an elongated plate spring. In order to assemble the key-return-spring member 110X and the key support member 103 together, a small projection of the key-return-spring member 110X is inserted in a small recess of the key support member 103 so that they are temporarily assembled together as shown in FIG. 14. Then, a root portion of the key-return-spring member 110X is covered by a synthetic-resin member 123 which is formed in accordance with a so-called "out-sert formation", so that the root portion of the key-return-spring member 123 is securely attached to the key support member 103. Further, a part of the key-return-spring member 110X which includes the teeth and which is not covered by the synthetic-resin member 123 is bent upwardly. Thus, each of the teeth is bent in a curved shape by interior walls at a back-end portion 114 of the key 101.

Figure 16:
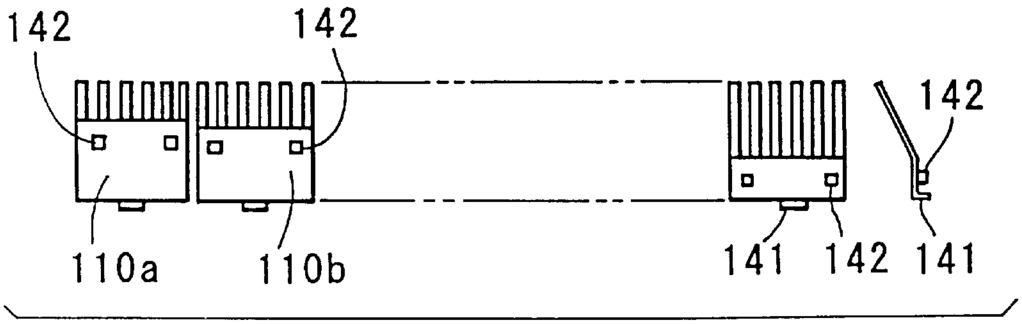
FIG. 16 shows a modification to the key-return-spring member.

The synthetic-resin member 123, which covers a part of the key-return-spring member 110X, has a shape as shown by FIG. 15, wherein a front-edge line 123*a* is slanted to an edge line of a back-end portion 116 of the key support member 103. Thus, a covered length for each tooth is gradually varied in such a way that a covered length for a tooth corresponding to a key having a lower pitch is greater than a covered length for a tooth corresponding to a key having a higher pitch; in other words, the covered length is gradually increased in a pitch-descending order. When the covered length is increased, a substantial length for each tooth (i.e., each key-return spring) is decreased so that a spring constant is increased. FIG. 15 shows that a key scaling to key-touch responses is performed with respect to each of the keys by changing the substantial length for each of the key-return springs. However, it is possible to change a unit of performing the key scaling by changing a straight front-edge line 123*a* to a step-like line, wherein each step corresponds to the unit of performing the key scaling. The unit can be set at three to four keys, a half octave or one octave. Or the key scaling can be performed with respect to a set of the melody keys or a set of the accompaniment keys. Thus, the spring constant is changed in a step-like manner. The synthetic-resin member 123 is provided to change the substantial length of each of the key-return springs. Function of the synthetic-resin member 123 can be accomplished by changing screw-fastening positions for the teeth of the key-return-spring member 110X. Specifically, each of the teeth is fastened to the key support member 103 by a screw at a position which meets a desired substantial length corresponding to a desired spring constant. In FIG. 15, one key-return-spring member 110X is used to provide all of the key-return springs for all of the keys. However, a modification can be made in such a way that as shown in FIG. 16, a plurality of key-return-spring members 110*a*, 110*b*, . . . are arranged linearly with respect to the keys. Each key-return-spring member has multiple teeth which correspond to multiple key-return springs for multiple keys. Each key-return-spring member is provided with respect to three to four keys, with respect to a half octave or with respect to one octave. Or each key-return-spring member is provided with respect to a set of melody keys or with respect to a set of accompaniment keys. For example, the same tooth length is set for each key-return-spring member but different spring constants are set respectively for the white key and black key in each key-return-spring member. In FIG. 16, each key-return-spring member has claws by which it is securely fixed to the key support member 103.

In the above example, the key-return springs (i.e., key-scaling structure) are provided independently of the key support member. However, it is possible to further modify the example in such a way that the key-return springs are formed together with the key support member by press working or by plastic-ejection formation.

Figure 17:
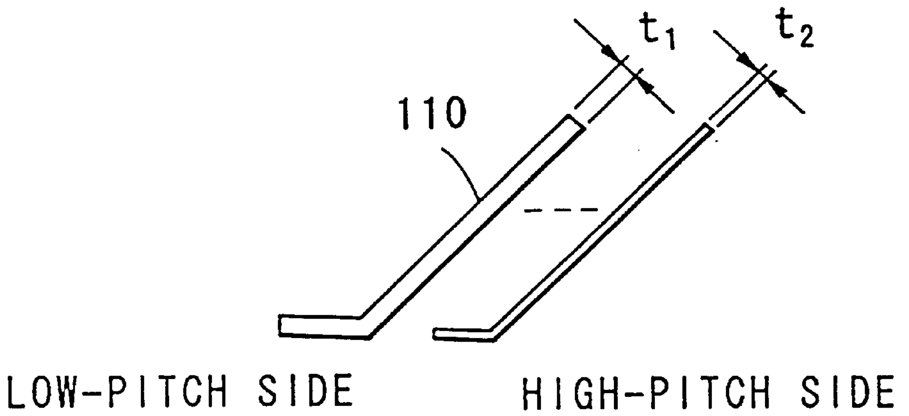
FIG. 17 shows another modification to the key-return-spring member.

Another modification is shown by FIG. 17 in which a thickness of the key-return spring is decreased in a pitch-ascending order; in other words, a thickness 't1' of a key-return spring for a key having a lower pitch is greater than a thickness 't2' of a key-return spring for a key having a higher pitch. Thus, a key scaling to key-touch responses is accomplished by changing the thickness of the key-return spring as well as by changing the width, length and angle of the key-return spring.

Figure 27:
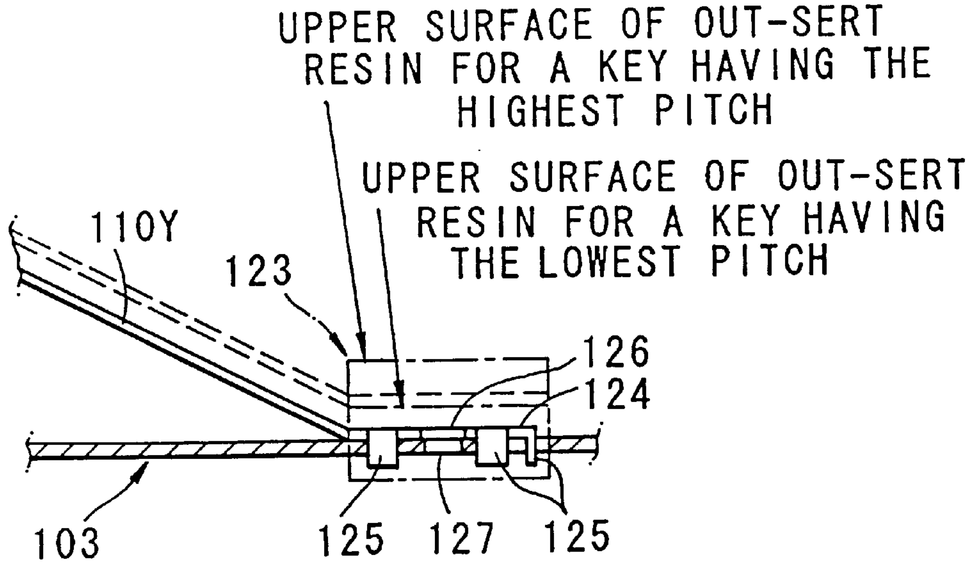
FIG. 27 is a side view illustrating an essential part of a key-return-spring member '110Y' which is applicable to the keyboard assembly of FIG. 13.
Figure 28:
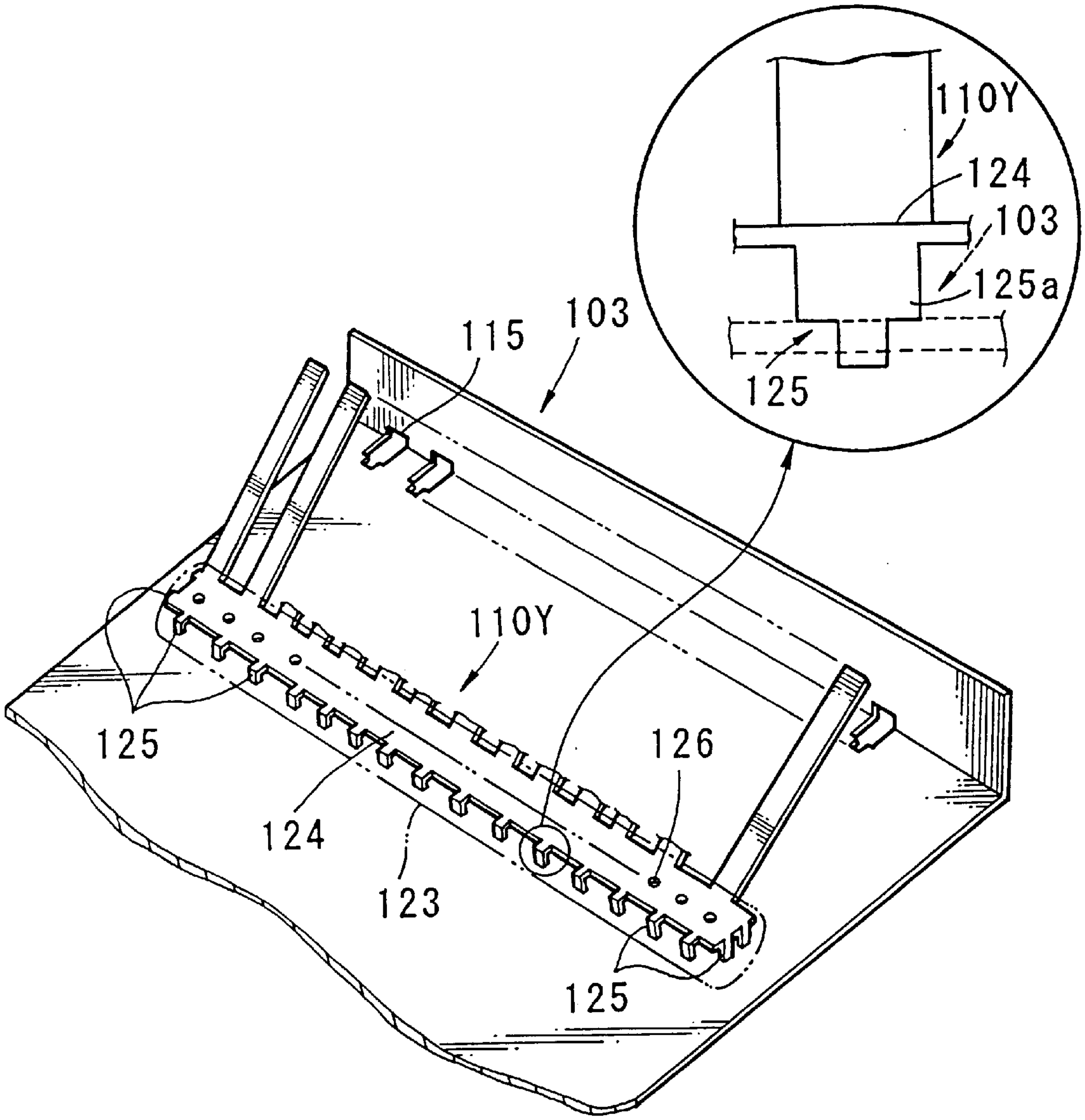
FIG. 28 is a perspective view illustrating the key-return-spring member 110Y which is attached on the key support member.
Figure 29:
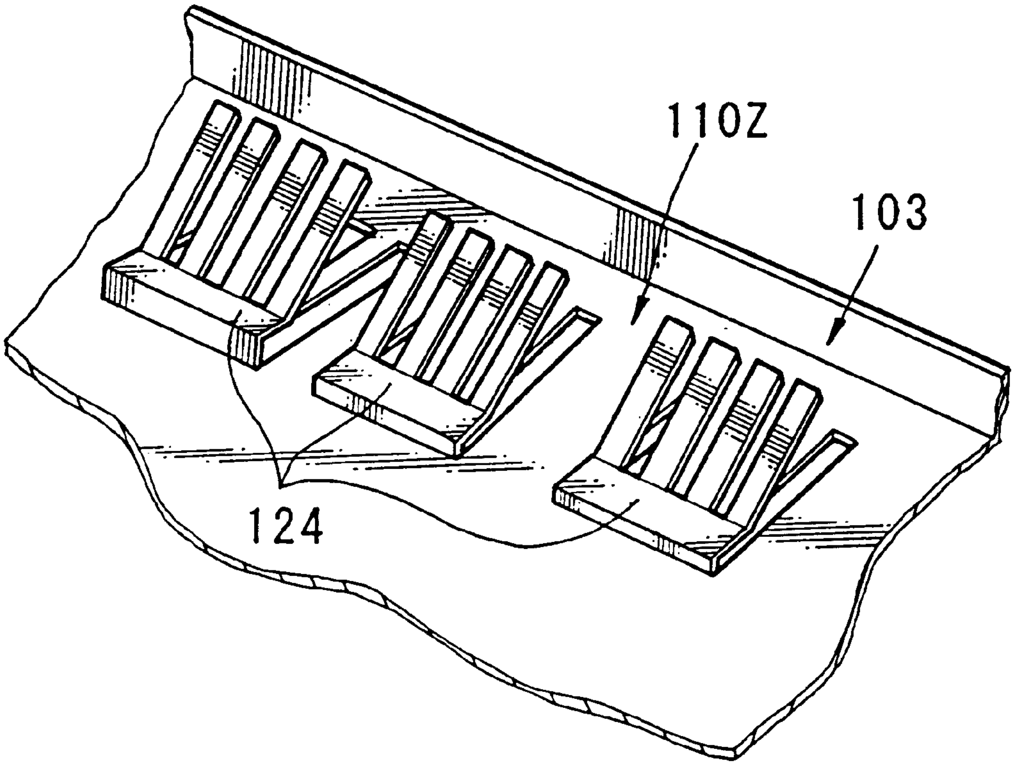
FIG. 29 is a perspective view illustrating a key-return-spring member '110Z' which is applicable to the keyboard assembly of FIG. 13.
Figure 30:
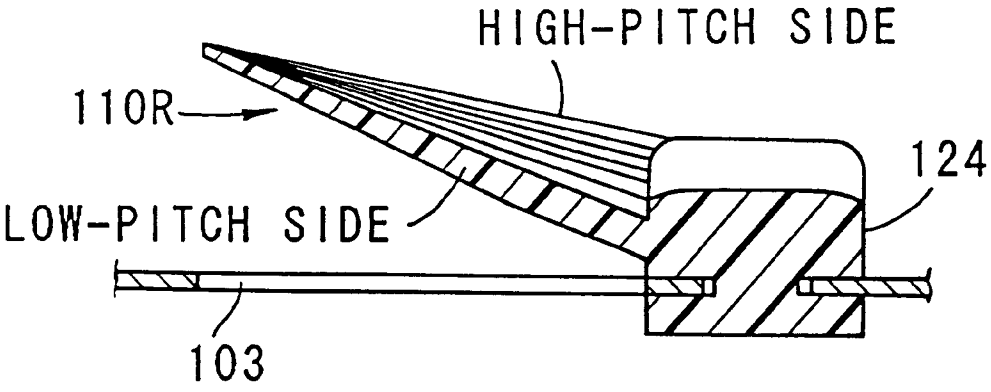
FIG. 30 is a side view illustrating a key-return-spring member '110R' which is applicable to the keyboard assembly of FIG. 13.

A still another modification is shown by FIGS. 27 and 28. Herein, a key-return-spring member '110Y', which is similar to the aforementioned key-return-spring member 110X, is provided independently of the key support member 103. A plurality of claws are formed and are disposed at sides of the key-return-spring member 110Y. Those claws are inserted into holes of the key support member 103 so that the key-return-spring member 110Y is temporarily fixed to the key support member 103. Further, a root portion 124 of the key-return-spring member 110Y, which is temporarily fixed to the key support member 103, is covered by a synthetic-resin member 123 which is formed in accordance with the out-sert formation, so that the root portion 124 of the key-return-spring member 110Y is securely fixed to the key support member 103. The root portion 124 is slanted to a surface of the key support member 103. In other words, the root portion 124 is located above and apart from the surface of the key support member 103 by a certain distance which is gradually increased in a pitch-ascending order. Therefore, a distance between the key support member 103 and the root portion 124 at a location which corresponds to a key having a higher pitch is greater than a distance between the key support member 103 and the root portion 123 at a location which corresponds to a key having a lower pitch. Thus, a key-return spring (i.e., tooth of the key-return-spring member 110Y) provided for a key having a higher pitch is elevated higher to approach close to the key. An elevation of the root portion 124 is embodied by a vertical length of a base portion 125*a* of the claw 125 (see FIG. 28) which is located on the surface of the key support member 103. The base portions of the claws, which are arranged along a lateral direction of the key support member 103, are different from each other in such a way that a vertical length of a base portion of a claw corresponding to a key having a higher pitch is greater than a vertical length of a base portion of a claw corresponding to a key having a lower pitch. As shown in FIGS. 27 and 28, a plurality of holes 126 are formed through the root portion 124 of the key-return-spring member 110Y and a plurality of holes 127 are formed through the key support member 103, so that resin material passes through those holes 126 and 127. Thanks to those holes, fixing between the key-return-spring member 110Y and the key support member 103 by the synthetic-resin member 123 is secured in terms of the out-sert formation. As described above, the root portion 124 of the key-return-spring member 110Y is attached to the key support member 103 in a slanted manner that an elevation between the root portion 124 and the surface of the key support member 103 is varied in a direction of disposing the keys; thus, initial load imparted to the key-return spring can be differed with respect to each of the keys. Such difference in initial load to the key-return spring enables a key scaling to be accomplished. Such technique of performing the key scaling by altering an elevation of the key-return spring can be applied to the keyboard assembly, in which the key-return spring is made by a part of the key support member 103, as well as shown in FIG. 29. In FIG. 29, a plurality of key-return-spring sections '110Z', each consisting of a plurality of key-return springs, are formed by press working and are arranged linearly on the key support member 103. A root portion '124' of each key-return-spring section has an elevation to the surface of the key support member 103, and the elevation is changed by adjusting the press working with respect to each key-return-spring section. A further modification is shown by FIG. 30 in which a key-return-spring member 110R, which is made by resin material, is provided and root portion '124' thereof is securely fixed to the key support member 103 in accordance with the out-sert formation. An elevation for a key-return spring '110R' is increased in a pitch-ascending order in such a way that an elevation for a key-return spring corresponding to a key having a higher pitch is greater than an elevation for a key-return spring corresponding to a key having a lower pitch.

The aforementioned modifications are characterized by that an elevation of a root portion of the key-return-spring member is gradually varied with respect to each of the keys. It is possible to present a further modification in which the key-return-spring member is provided independently of the key support member so that a key scaling is performed by changing height of a supporting member (such as a spacer) provided between the key support member and key-return-spring member.

(2) Second Modified Example

Figure 18:
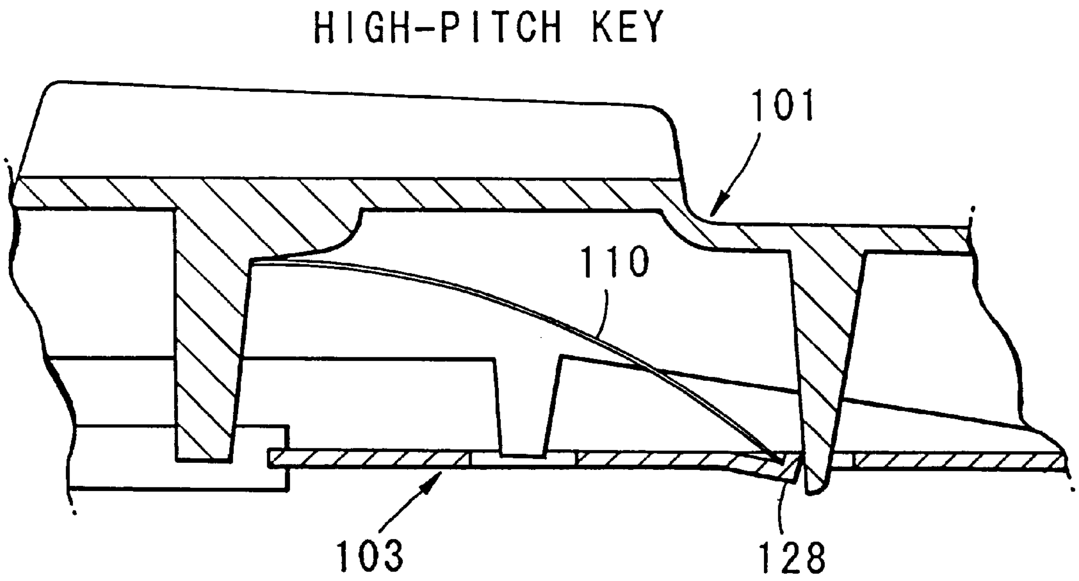
FIGS. 18 and 19 are cross-sectional views respectively illustrating a higher-pitch key and a lower-pitch key used by a keyboard assembly according to a second modified example of the second embodiment.
Figure 19:
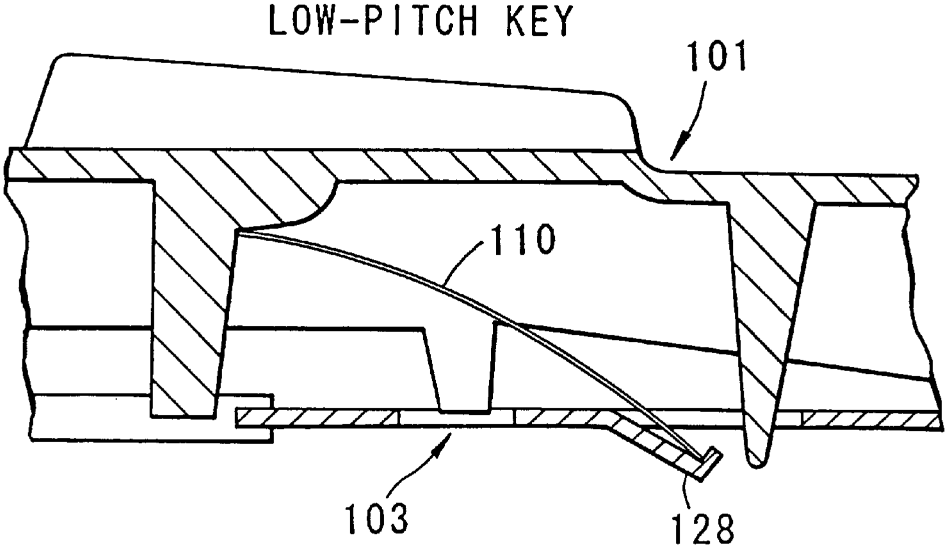

FIGS. 17 and 18 show a second modified example for the second embodiment, in which an elevation of a spring-terminating portion 128 is changed to effect a key scaling to key-touch responses. Herein, a part of the key support member 103 is subjected to press working so as to form the spring-terminating portion 128 by which another end of the key-return spring is terminated. As compared to a horizontal plane of the key support member 103, the spring-terminating portion 128 is bent downwardly. A downward-bending angle of the spring-terminating portion 128 is changed in such a way that a downward-bending angle is increased in a pitch-descending order; in other words, a downward-bending angle for a key having a lower pitch is greater than a downward-bending angle for a key having a higher pitch. As the downward-bending angle is increased larger, a degree of bending of the key-return spring 110 is increased higher. Thus, elastic resilience made by a key-return spring corresponding to a key having a lower pitch is increased larger than elastic resilience made by a key-return spring corresponding to a key having a higher pitch.

(3) Third Modified Example

Figure 20:
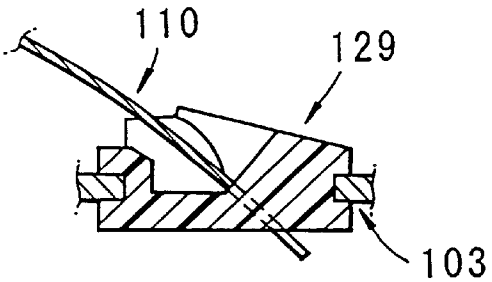
FIGS. 20 and 21 are cross-sectional views respectively showing a higher-pitch key and a lower-pitch key used by a keyboard assembly according to a third modified example of the second embodiment.
Figure 21:
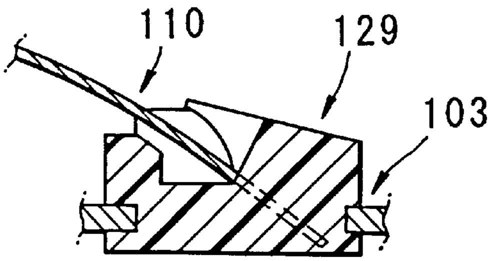

FIGS. 20 and 21 show a third modified example for the second embodiment. Herein, a spring support member 129, which is attached to a hole of the key support member 103, is formed in accordance with the out-sert formation, so that another end of the key-return spring 110 is supported by the spring support member 129. By changing a shape of the spring support member 129, an elevation at which a key-return spring corresponding to a key having a lower pitch is supported is set different from an elevation at which a key-return spring corresponding to a key having a higher pitch is supported.

(4) Fourth Modified Example

Figure 22:
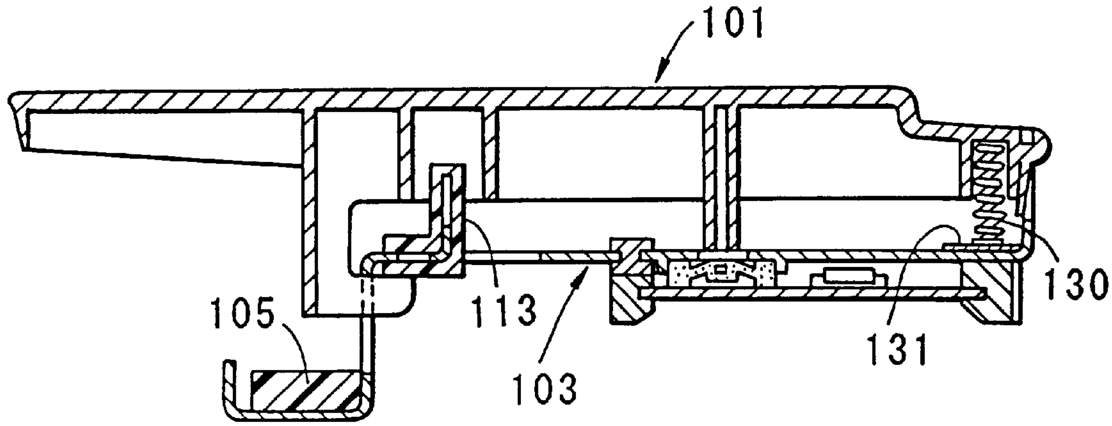
FIG. 22 is a cross-sectional view illustrating a structure of a keyboard assembly according to a fourth modified example of the second embodiment.
Figure 23:
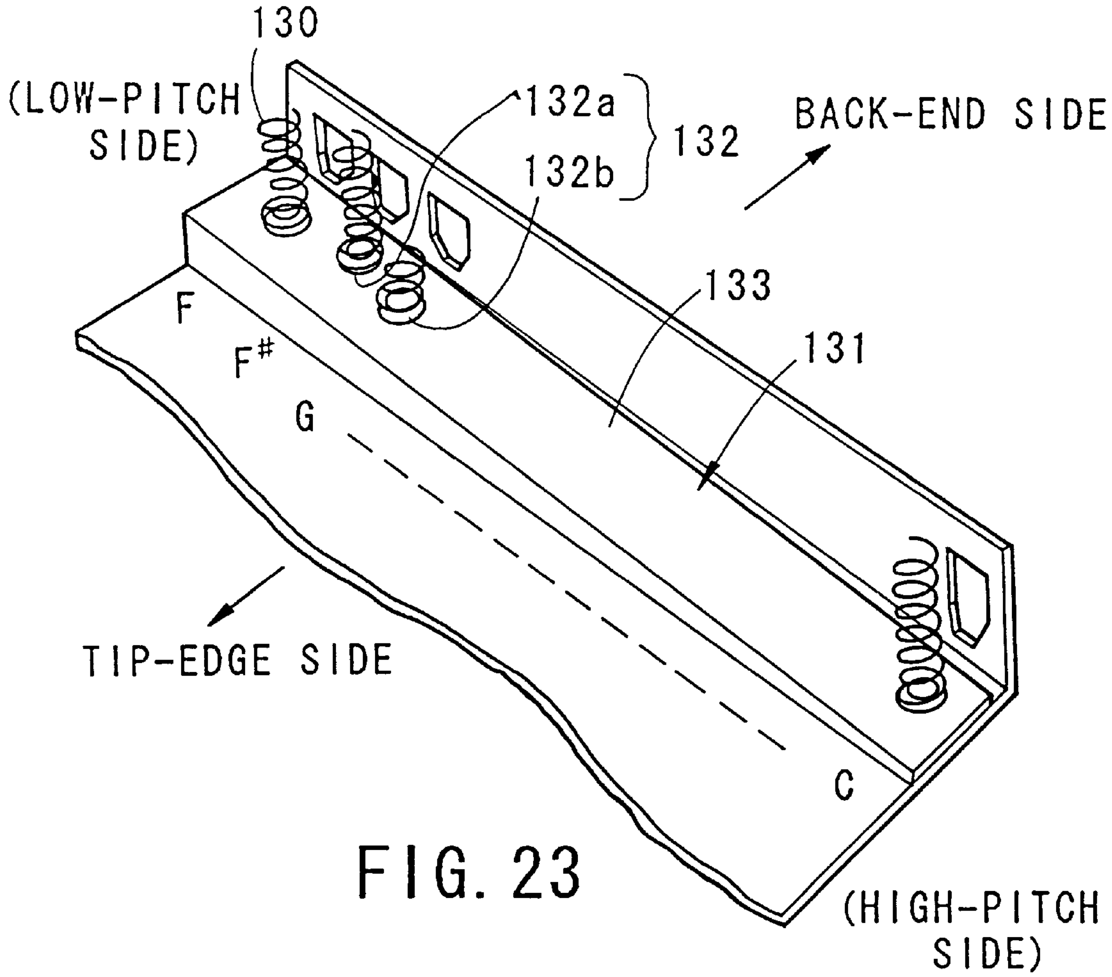
FIG. 23 is a perspective view illustrating an essential part of the keyboard assembly of FIG. 22.

FIGS. 22 and 23 show a fourth modified example for the second embodiment. Different from the aforementioned examples in which the key-return spring 110 is made by a plate spring, this example uses a plurality of coil springs 130 by which key-return force is imparted to the key 101.

Figure 24:
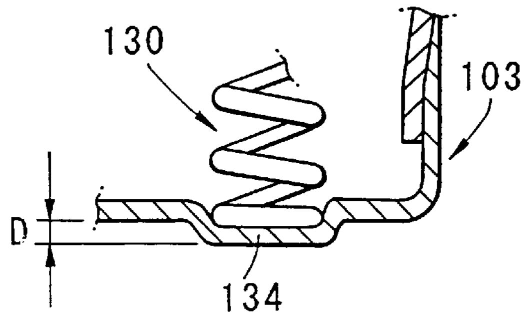
FIG. 24 is a side view illustrating an essential part of a modification to the keyboard assembly of FIG. 22.

Herein, all of the coil springs, used by all of the keys respectively, have the same spring constant. As a means to effect a key scaling to key-touch responses, a spring support member 131, which is formed by out-sert resin, is attached to the surface of the key support member 103. A plurality of coil springs are respectively placed to engage with a plurality of projections '132' which are disposed on a surface of the spring support member 131. The spring support member 131 is subjected to taper formation, in other words, the surface of the spring support member 131 is slanted in a direction of disposing the keys. Therefore, an elevation applied to each key by the spring support member 131 is changed in such a way that the elevation is increased in a pitch-descending order; in other words, an elevation applied to a key having a lower pitch is set higher than an elevation applied to a key having a higher pitch. When an elevation applied to the key 101 is increased, a distance between the key 101 and the spring support member 13i is decreased, so that compression to the coil spring 130 is increased; in other words, an initial load to the key 101 is increased so that elastic resilience made by the coil spring 130 is increased. As a result, elastic resilience which is imparted to a key having a lower pitch is increased larger than elastic resilience which is imparted to a key having a higher pitch. In order to obtain the same key-touch response with respect to both of the white key and black key which are arranged adjacent to each other, a location of a projection '132*a*' for the black key is shifted to a back-end side of the keyboard as compared to a location of a projection '132*b*' for the white key. Therefore, the projections 132*a* and 132*b* used for the black key and white key respectively are placed in a so-called "zigzag manner" so as to make a variation of the elastic resilience. Incidentally, a further modification can be made as shown by FIG. 24. Instead of using the spring support member 131 on which surface a plurality of projections are disposed, a plurality of recesses '134' are formed on the key support member 103 so that each spring 130 engages with each recess. A depth 'D' of the recess 134 is changed with respect each of the keys, so that elastic resilience made by the coil spring 130 is subjected to key scaling.

In FIG. 23, the locations of the coil springs are placed in the zigzag manner in order to perform a key scaling on key-touch responses of the black key and white key. Instead, it is possible to dispose all of the locations of the coil springs on a straight line. In that case, in order to perform a key scaling on key-touch responses of the black key and white key, heights of the projections are changed in such a way that the projection 132*b* for the white key is higher in height than the projection 132*a* for the black key. Or a base portion for the projection 132*b* provided for the white key is made higher in height than a base portion for the projection 132*a* provided for the black key. This will avoid an event in which elastic resilience of the spring for the white key becomes weaker than that of the spring for the black key if a distance between a spring-terminating location and a supporting point of the white key is identical to a distance between a spring-terminating location and a supporting point of the black key. Thus, pre-tension imparted to the white key is made stronger than pre-tension imparted to the black key.

(5) Fifth Modified Example

Figure 25:
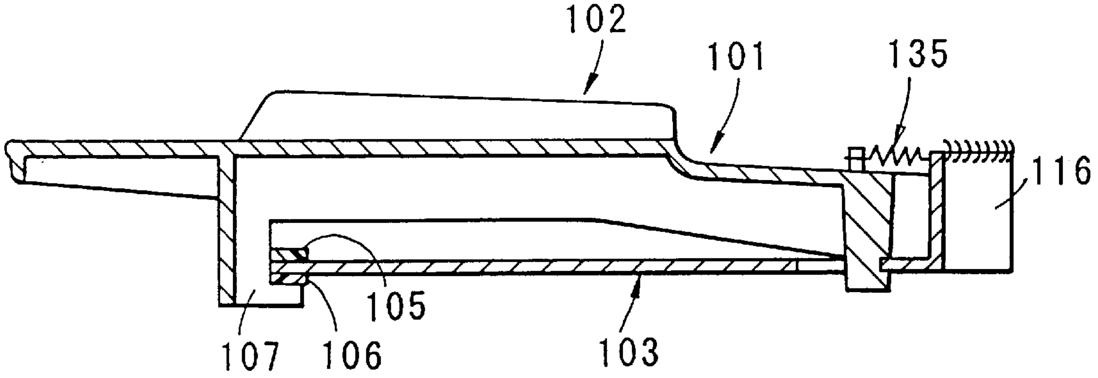
FIG. 25 is a cross-sectional view illustrating a structure of a keyboard assembly according to a fifth modified example of the second embodiment.
Figure 26:
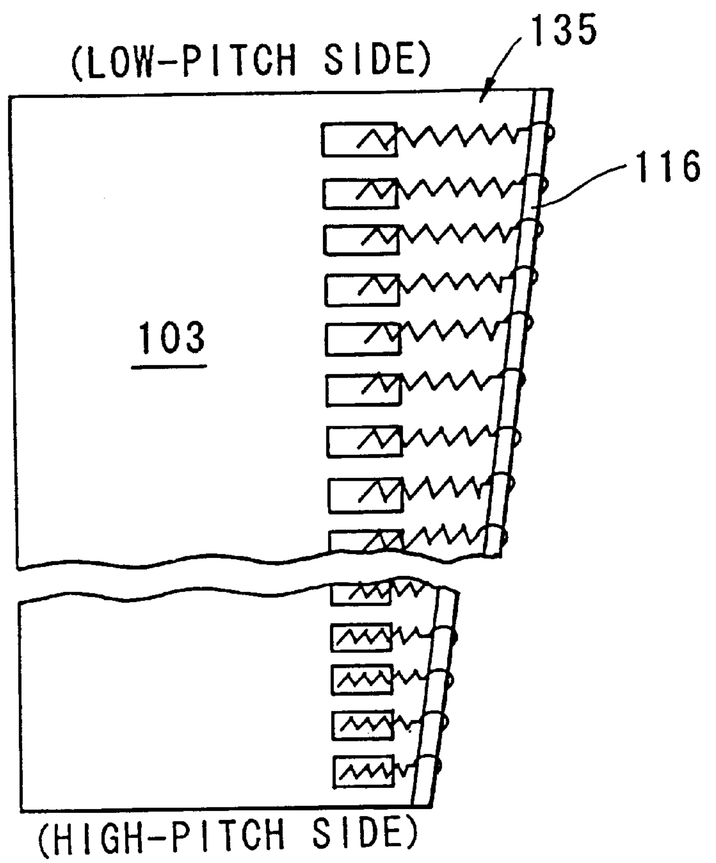
FIG. 26 is a plan view illustrating an essential part of the keyboard assembly of FIG. 25.

FIGS. 25 and 26 show a fifth modified example for the second embodiment. As similar to the fourth modified example of FIGS. 22 and 23, this example of FIGS. 25 and 26 uses a plurality of coil springs to perform a key scaling on the key-return force. Herein, the back-end wall 116 of the key support member 103 is subjected to taper formation in a horizontal direction as shown by FIG. 26. Thus, a distance between the back-end wall 116 and a back-end portion of a key having a lower pitch is greater than a distance between the back-end wall 116 and a back-end portion of a key having a higher pitch. A tension spring 135 is provided for each key in such a way that one end thereof is fixed to the back-end portion of the key while another end thereof is terminated by the back-end wall 116. Therefore, a tension spring provided for a key having a lower pitch is extended larger than a tension spring provided for a key having a higher pitch. When the tension spring is extended, key-return force imparted to the key is increased. Thus, key-return force imparted to a key having a lower pitch is increased larger than key-return force imparted to a key having a higher pitch. As a result, a key scaling is performed on key-touch responses of the keys.

[C] Third Embodiment

Before specifically describing the third embodiment of the present invention, the background of the third embodiment will be described below.

As described before, the key scaling is performed by adjusting a manner of winding the felt or by adjusting weight of the member of lead material. However, the key scaling, using adjustments to those elements, is hard to be performed. In other words, it is difficult to perform the key scaling to key-touch responses in a stable manner and with high precision. In order to obtain a good performability with respect to the key scaling to key-touch responses, it is necessary to make a good selection for mechanical parameters which embody the key scaling; and it is necessary to construct the keyboard assembly with a key-scaling structure which can certainly alter the key-touch responses of the keys of the keyboard with ease. In order to analyze those mechanical elements, it is necessary to perform dynamical study on both of the static key-touch response and dynamic key-touch response.

Figure 39:
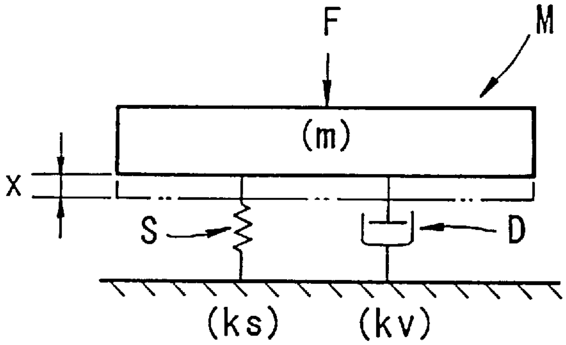
FIG. 39 is a schematic figure which is used to explain a principle for design of the third embodiment.

FIG. 39 is a schematic figure which is used to analyze a system which represents physical property in motion of the key. This system contains fluid having a coefficient of viscosity 'kv' and an elastic body having a spring constant 'ks'. According to the second law of motion, relationship between force of finger 'F' and displacement of key 'x' can be represented by a general formula, as follows:

$$F=m(d^2x/dt^2)+kv(dx/dt)+ks(x)$$

where 'F' represents depressing force, made by a finger, on a key 'M'; 'x' represents an amount of displacement effected on the key M; 'm' represents weight of the key M; '$d^2x/dt^2$' represents acceleration of displacement; 'kv' represents a coefficient of viscosity at a dash pot 'D'; 'dx/dt' represents speed of displacement of the key M; and 'ks' represents a spring constant of a spring 'S'.

The above formula is an equation of motion regarding a body 'M', having mass 'm', wherein the body M, connected with the spring 'S', is moved in fluid of the dash pot D by being effected by external force 'F'. In the formula, first term corresponds to inertia; second term corresponds to viscosity; and third term corresponds to elasticity.

The above formula indicates that the key scaling can be performed by changing parameters (m, kv, ks) in a step-by-step manner with respect to a certain key or with respect to a certain register of the keyboard. Each of those parameters is embodied by one or several elements, as follows:

(a) Parameter 'm'
  (i) mass of a deadweight attached to the key
(b) Parameter 'kv'

(i) viscous resistance of grease provided at a sliding area of the key guide;

(ii) viscous resistance of grease provided at a sliding area of a key-supporting point; and (iii) frictional resistance against depressing force imparted to the key guide and key-supporting point (c) Parameter ‘ks’

(i) restoring force of a rubber film or a plate spring at a switch-contact point of the key; and (ii) a spring constant of the key-return spring (d) Geometric factors regarding the parameter ‘x’

(i) a location at which the deadweight is attached to the key;

(ii) a location of the spring-terminating portion;

(iii) a location of the switch;

(iv) a location of the key guide; and (v) a location of the key-supporting point.

The above-mentioned elements or factors can be combined together to perform a desired key scaling to key-touch responses.

In acoustic pianos, hammers, provided for a low-pitch division of the keyboard, are modified to obtain overtone components, which are close to fundamental-tone components, so that piano sounds are produced with enough sounding time, with sufficient tone volume and with rich tone color. In order to do so, weight of an overall mechanical structure of the acoustic piano is increased to a certain degree so as to increase string-striking energy given by the hammer. For this reason, some acoustic piano is designed in such a way that a key scaling to key-touch responses is performed by adjusting weight of the hammer. Normally, the key scaling to key-touch responses is accomplished within a complicated action mechanism, which is provided between the keyboard and body of the acoustic piano. Motions of the action mechanism may meet properties of the aforementioned formula which consists of three terms regarding the inertia, viscosity and elasticity.

The key scaling performed by the acoustic piano is hard to be performed by the general electronic keyboard instrument because complicated adjustments are required.

In the field of the acoustic pianos, there is provided a key-scaling technology for adjusting weight of the hammer, which is disclosed by Japanese Utility-Model Laid-Open No. 54-94221, for example. In general, the acoustic piano performs a key scaling by adjusting the deadweight attached to the key, instead of increasing weight of the hammer for the low-pitch division. In the acoustic piano, the complicated action mechanism and keys associate with each other to make motions which meet all of the factors in the aforementioned formula. In other words, when effecting a physical analysis on operations of the key and action mechanism of the piano, it is possible to find out a fact proving that their motions match with the aforementioned formula. In the aforementioned formula, the second term, regarding the viscosity, may be presented by a phenomenon corresponding to hysteresis characteristic of the reaction against the depression of key or release of key. This proves that the similar phenomenon of the second term should occur in the action mechanism. The action mechanism of the acoustic piano has a complicated structure and is expensive. So, there is a demand to provide a good touch-response mechanism which has a simple structure and is inexpensive.

The key scaling conventionally performed by the electronic musical instrument is different from the key scaling performed by the acoustic piano in terms of the hysteresis characteristic in motions of displacement which emerge when the key is depressed and is returned to the normal position. The above hysteresis characteristic highly depends on the coefficient of viscosity kv regarding the dash pot D shown in FIG. 39. However, the electronic keyboard instruments conventionally known are not designed to perform the key scaling responsive to the hysteresis characteristic.

Next, a detailed study is given with respect to an effect of viscosity on the key-touch response.

Figure 40A:
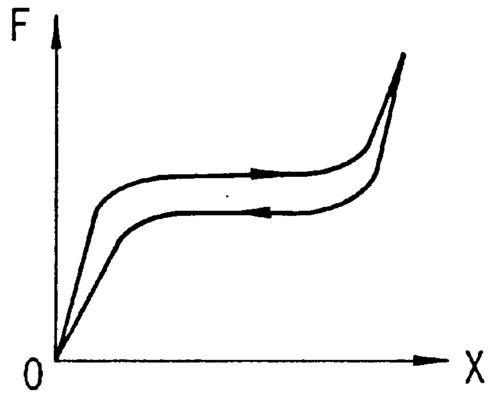
FIGS. 40A to 40D are graphs each showing a hysteresis characteristic for one cycle in a depression of key.
Figure 40B:
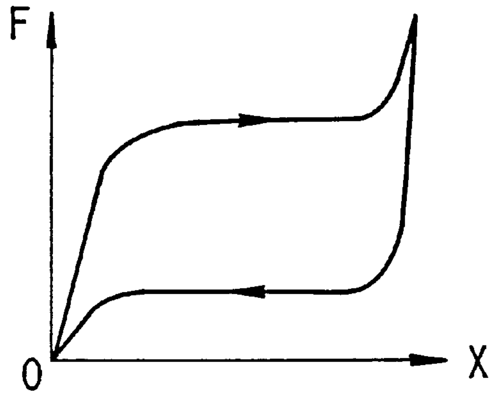
Figure 40C:
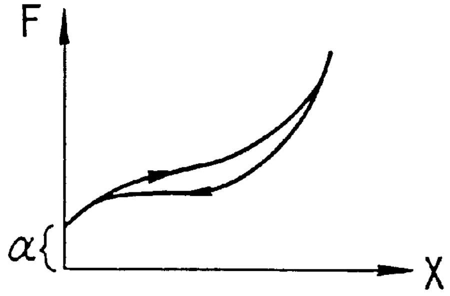
Figure 40D:
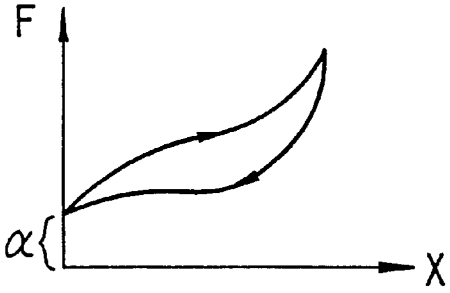

FIGS. 40A to 40D are graphs each showing a hysteresis characteristic representing reaction to the depression of key based on the viscosity applied to the key in which viscous material, such as the grease, is provided at the sliding area. FIGS. 40A and 40B show hysteresis characteristics on the reaction to the depression of key, in which each characteristic is given with a different coefficient of viscosity of the grease. Specifically, the hysteresis characteristic of FIG. 40A is given under a condition where the coefficient of viscosity is relatively low, while the hysteresis characteristic of FIG. 40B is given under a condition where the coefficient of viscosity is relatively high. On the other hand, FIGS. 40C and 40D show hysteresis characteristics on the reaction to the depression of key which is affected by reaction of the spring in addition to the viscosity of the grease and which is given under the consideration of initial force (e.g., bias $\alpha$) required to start a depressing motion of a key. Specifically, the hysteresis characteristic of FIG. 40C is given with respect to a key which has a relatively high pitch and whose key-touch response is relatively “light”, while the hysteresis characteristic of FIG. 40D is given with respect to a key which has a relatively low pitch and whose key-touch response is relatively “heavy”.

The keyboard assembly according to the third embodiment is designed to perform a key scaling using the viscous resistance which occurs at a sliding area between the key and key support member or between the key and another member, which associates with the key, within a duration in which displacement of the key is progressing. The viscous material having a relatively small coefficient of viscosity is used by a key or keys which belong to a high-pitch division of the keyboard, while the viscous material having a relatively large coefficient of viscosity is used by a key or keys which belong to a low-pitch division of the keyboard. As shown by FIGS. 40A to 40D, the hysteresis characteristic for the high-pitch division is different from the hysteresis characteristic for the low-pitch division. Hence, by simulating such phenomenon, the third embodiment can offer the keyboard assembly which is capable of altering the key-touch response in a variety of manners with a simple structure like the acoustic piano. In addition, a manner of performance of the keyboard depends upon a rise-starting point of a hysteresis curve as well as an area inside of the hysteresis curve. Hence, by adequately controlling a shape of the hysteresis curve, it is possible to alter the key-touch response in a variety of manners.

The key scaling to be performed by the third embodiment depends upon a geometric shape or size of the sliding area; in addition, it highly depends upon the coefficient of viscosity of the viscous material such as the grease as well. Moreover, it is possible to combine the key scaling, accomplished by controlling the weight of the key, together with the key scaling, accomplished by controlling the reaction of the key-return spring or the like. Such combination can offer an effective way to perform the key scaling.

Figure 31:
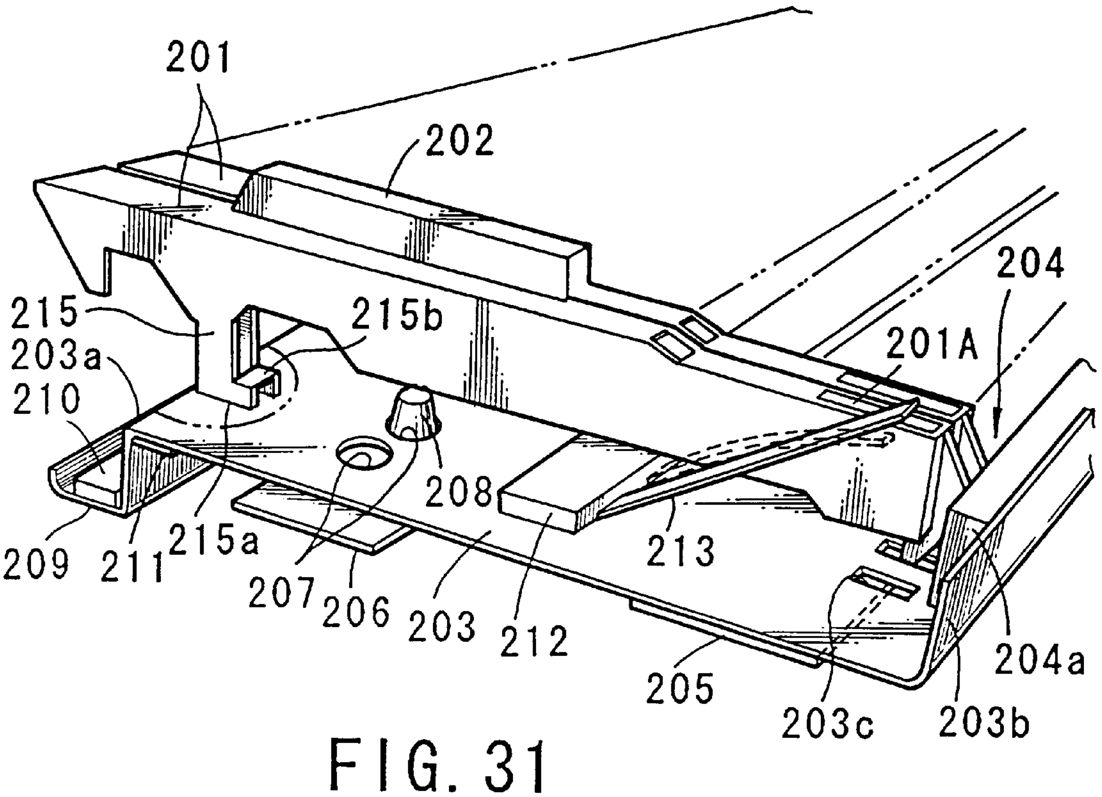
FIG. 31 is a perspective view illustrating a keyboard assembly according to a third embodiment of the present invention.
Figure 32:
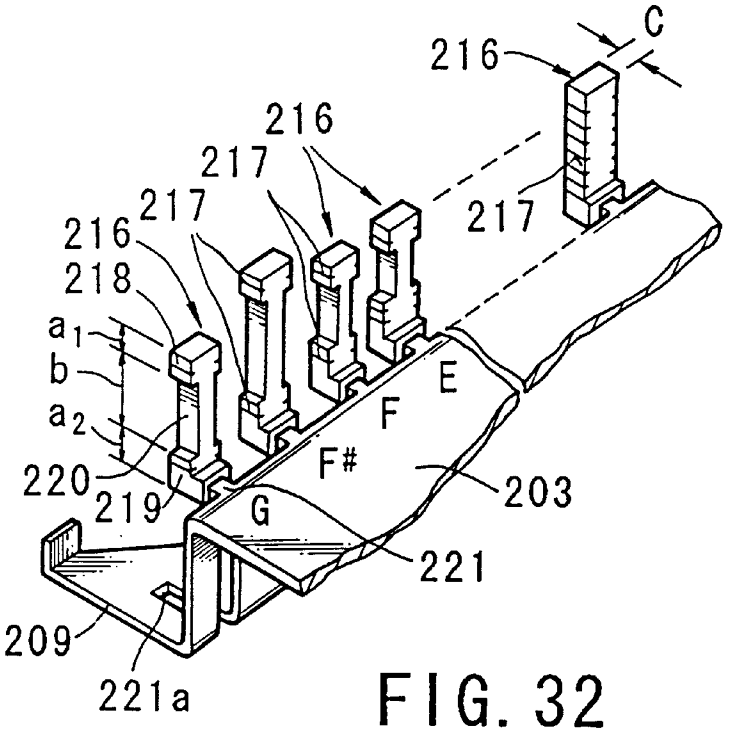
FIG. 32 Is a perspective view illustrating an essential part, regarding a key guide, of the keyboard assembly of FIG. 31.

Now, a keyboard assembly according to the third embodiment of the present invention will be described. FIGS. 31 and 32 are perspective views illustrating the keyboard assembly of the third embodiment. In FIG. 32, high-pitch keys are arranged in left side, while low-pitch keys are arranged in right side. White keys (represented by a numeral '201') and black keys (represented by a numeral '202') are arranged in a certain order of arrangement on a key support member 203.

A front-end portion of the key support member 203, which is made by metal material, is bent downwardly to form a lip-like end portion 209. There are provided a lower-limit stopper 210 and an upper-limit stopper 211, both of which are made by felt material. The lower-limit stopper 210 is attached to an upper surface of the lip-like end portion 209, while the upper-limit stopper 211 is attached to a lower surface of the key support member 203 in proximity to the lip-like end portion 209. A slide-guide element 215 projects downwardly from each of the keys. Herein, the slide-guide element 215 has side walls, each having a letter 'L' like shape, and a bottom-end portion connecting the side walls. A low-end surface 215*a* of the bottom-end portion of the slide-guide element 215 comes in contact with the lower-limit stopper 210 when the key 201 is depressed. An upper-end surface 215*b* of the bottom-end portion of the slide-guide element 215 comes in contact with the upper-limit stopper 211 when the key 201 is returned to the normal position.

As similar to the foregoing embodiments, when the key 201 is depressed so that the low-end surface 215*a* of the slide-guide element 215 comes in contact with the lower-limit stopper 210, a depression of the key 201 is stopped. An elevation of the key 201 whose depression is stopped by the lower-limit stopper 210 is defined as a lower-limit position in a key-depression stroke of the key 201. When the depression of the key 201 is released, the key 201 is raised up by being pressed up by a key-return spring 213. Thereafter, when the upper-end surface 215*b* of the slide-guide element 215 comes in contact with the upper-limit stopper 211, a key-return motion is stopped. An elevation of the key 201 whose key-return motion is stopped by the upper-limit stopper 211 is defined as an upper-limit position in the key-depression stroke.

In FIG. 32, numeral '216' represents key guides which are arranged at a bent portion of the key support member 203 in accordance with an arrangement of the keys. Each of the key guides '216' is formed by an element 221 and a synthetic-resin member which is subjected to out-sert formation. The element 221 is cut out from the bent portion of the key support member 203 and from a part of the lip-like end portion 209 by rapping mold. A width of the element 221 is smaller than a distance between the side walls of the slide-guide element 215. The element 221 has a letter 'L' like shape, wherein a base part thereof is placed in a horizontal plane of the key support member 203 and an end part thereof is bent upwardly; and then, the synthetic-resin member is formed around the end part of the element 221. Incidentally, a numeral '221*a*' shows a cut hole which corresponds to the element 221.

In the depression of key, the key 201 is guided by the key guide 216 in such a way that interior faces of the side walls of the slide-guide element 215 slide with side faces of the key guide 216. The key guide 216 is provided to avoid lateral movement and/or twisted movement of the key 201. Slide areas 218 and 219 are provided vertically on each of the side faces of the key guide 216. Some viscous material like the grease is provided at each of those slide areas 218 and 219 so that viscous resistance is provided between the key guide 216 and the slide-guide element 215 of the key 201. At a vertical area between the slide areas 218 and 219, a recess 220 is provided as a grinding undercut or the like. Moreover, this recess 220 is provided for adjusting the viscous resistance and is provided as a grease bank as well. A channel '217' is formed on each of the slide areas 218 and 219 in a longitudinal direction of the key. The channel 217 functions as the grease bank; in other words, the channel 217 is provided to normally retain the grease on each of the slide areas 218 and 219. The third embodiment uses the channel 217 as the grease bank. However, it is possible to change it to another mechanical structure such as a recess having an adequate shape.

At a back-end portion 204 of the key 201, a rib, roughly having a triangle shape, is formed. A pivot shaft (not shown) projects from a summit portion of the rib. A back-end portion of the key support member 203 is bent upwardly to form a back-end wall 203*b*, to which a bearing block 204*a* is attached. The bearing block 204*a* provides a pivot bearing (not shown; i.e., a recess having a triangular-pyramid-like shape or a circular-cone-like shape. A tip-edge portion of the aforementioned pivot shaft is inserted through the pivot bearing, so that the key 201 is supported by a plate spring, which will be described later, in such a way that the key 201 can freely swing up and down. A low-end portion of the triangular rib, which is provided at the back-end portion 204 of the key 201, is inserted into a hole 203*c* which is formed by effecting press punching to the key support member 203. The low-end portion of the triangular rib is placed to face with an edge face of a synthetic-resin sheet 205 which is adhered to a back surface of the key support member 203. The low-end portion of the triangular rib comes in contact with the edge surface of the synthetic-resin sheet 205, so that even if the key is pulled in a front direction, the key is not depart from the key support member 203.

Figure 33:
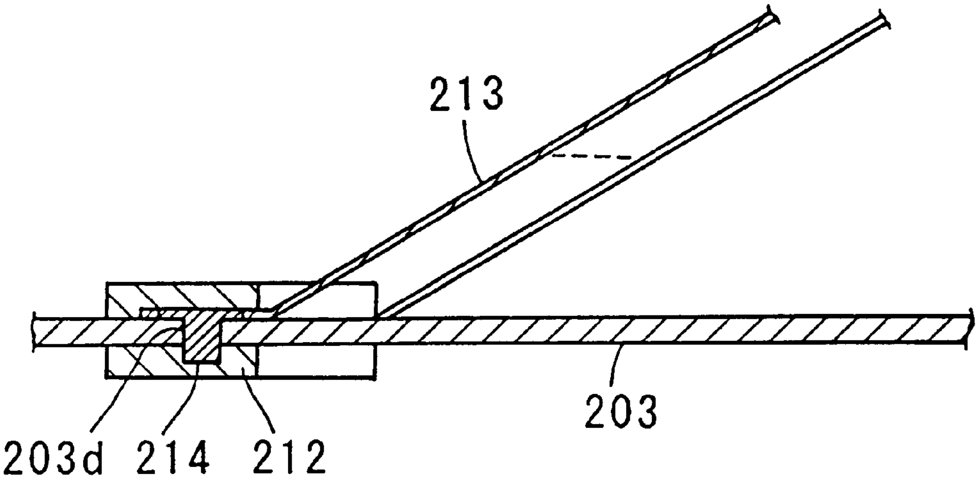
FIG. 33 is a side view illustrating a way of fixing a key-return spring to a key support member in the keyboard assembly of FIG. 31.

FIG. 33 shows a mechanical structure by which a base portion of the key-return spring 213 is fixed to the key support member 203. The key-return spring 213 is a plate spring having a long and slender shape. A plurality of pins '214', which project downwardly from the base portion of the key-return spring 213, are inserted into small holes which are formed through the key support member 203, so that the base portion of the key-support spring 213 is temporarily fixed to the key support member 203. Then, a synthetic-resin member 212 are formed by the out-sert formation to cover the base portion of the key-return spring 213. The key-return spring 213 is bent upwardly so that a tip-edge portion thereof is terminated by interior walls of the key 201. A location at which the base portion of the key-return spring 213 is fixed to the key support member 203 is changed with respect to each of the keys or with respect to each division of the keyboard in a longitudinal direction of the key or keys. This enables a key scaling to key-touch responses in accordance with the property of the third term of the aforementioned formula regarding the elasticity.

In FIG. 33, the key-return spring 213 stretches linearly; however, when being engaged with the key 201, the key-return spring 213 is bent in a curved shape so as to yield elastic resilience. The elastic resilience of the key-return spring 213 presses the key 201 upwardly; and partial force thereof functions to press the pivot shaft toward the inside of the pivot bearing of the bearing block 204*a*. Thus, the key 201 is securely supported by the key support member 203 such that the key 201 can freely swing up and down. When disassembling the keyboard assembly of the third embodiment, a driver or the like is inserted into a hole 201A, which is formed at an upper face of the back-end portion of the key 201, so as to put off the key-return spring 213 from the interior wall of the key 201; and then the key 201 is pulled out in a front direction with pressing an edge portion of the synthetic-resin sheet 205, so that a connection established between the triangular rib and the synthetic-resin sheet 205 is released. Thus, the key 201 can be easily disassembled from the key support member 203.

As shown in FIG. 31, a main printed substrate 206 is fixed beneath the key support member 203 at its roughly center portion. Several kinds of switch circuits and/or control circuits are fabricated on the main printed substrate 206. A key switch 208 is mounted on the main printed substrate 206 in connection with each of the keys. The key switch 208 is inserted through a hole 207, which is formed through the key support member 203, and a part of the key switch 208 projects upward from an upper surface of the key support member 203. The key switch 208 is a so-called two-make-contact-type switch using an elastic member made by rubber material or the like. The key switch 208 is driven by an actuator (not shown).

After the key 201 is depressed, the side walls of the slide-guide element slide along the slide areas 218 and 219 of the key guide 216, so that the slide-guide element 215 is moved down and up between the lower-limit stopper 211 and the upper-limit stopper 210. In FIG. 32, one key guide, provided for the black key 202 having a note F#, has a height which is larger than a height of the other key guides provided for the white keys having notes G, F and E respectively. An overall vertical length of the key guide 216 in FIG. 32 is divided into three lengths, wherein 'a1' represents a vertical length of the slide area 218; 'a2' represents a vertical length of the slide area 219; and 'b' represents a vertical length of the recess 220. At least one of those vertical lengths a1, a2 and b is changed with respect to each of the keys; but a lateral width 'c' is set constant. In that case, an overall slide area 'A' is proportional to a sum of the vertical lengths a1 and a2, i.e., "a1+a2". In the third embodiment shown by FIG. 32, only the vertical length a2 of the slide area 219 is changed with respect to each of the keys so as to change the overall slide area A, by which a key scaling is performed. Of course, the third embodiment is modified in such a way that one or some of the vertical lengths a1, a2 and b are changed. In order to prevent the recess 220 from affecting a manner of sliding between the key guide 216 and the slide-guide element 215, the grease should be allocated to the slide areas 218 and 219 only. Because, if the recess 220 is perfectly filled with the grease, the viscous resistance may be made even with respect to all of the keys. If the viscous resistance is made even, an effect of changing the overall slide area A must be reduced. This will reduce an effect of the key scaling as well.

(1) First Modified Example

Figure 34:
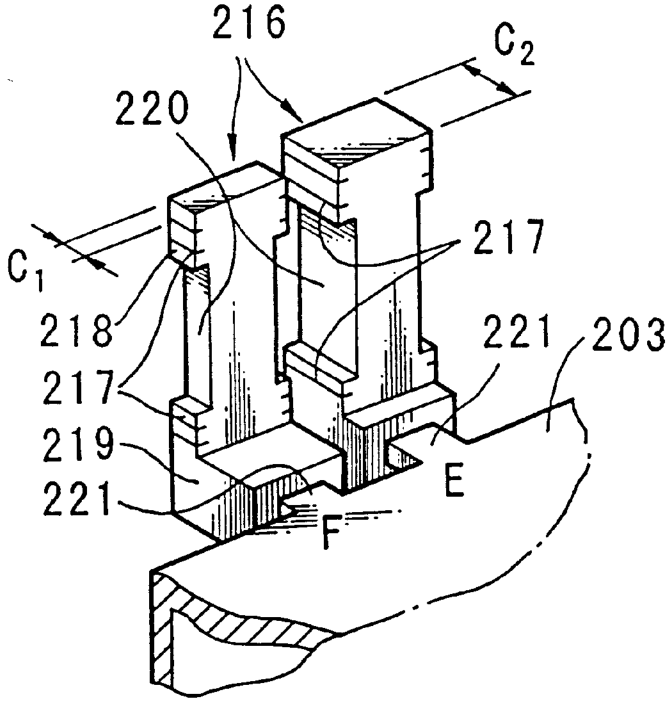
FIG. 34 is a perspective view illustrating an essential part of a keyboard assembly according to a first modified example of the third embodiment.

FIG. 34 shows an essential part, regarding the key guide 216, of a keyboard assembly according to a first modified example of the third embodiment. The keyboard assembly of the first modified example is designed to perform a key scaling by changing the lateral width 'c' of the key guide 216. Specifically, a lateral width 'c1' of a key guide for a high-pitch key is made small so as to reduce resistance to a depression of the high-pitch key, while a lateral width 'c2' of a key guide for a low-pitch key is made large so as to increase resistance to a depression of the low-pitch key. Such a manner of key scaling is certainly affected by the overall slide area A: however, thanks to a variation of the lateral width 'c' of the key guide 216, it is possible to apply a variation to initial resistance to the depression of key. Incidentally, the illustration of FIG. 34 may be exaggerated in order to clearly make a difference between the lateral widths c1 and c2.

(2) Second Modified Example

Both of the examples of FIGS. 32 and 34 are designed to perform a key scaling by changing geometric elements a1, a2, b and c independently with respect to each of the keys.

A second modified example, whose illustration is omitted, is provided to perform a key scaling by changing the lateral width c with respect to each division of the keyboard (e.g., half-octave division, one-octave division or two-octave division), so that the same overall slide area is applied to each division of the keyboard. In the second modified example, it is preferable that an extremely shift in key-touch response does not emerge between adjacent divisions of the keyboard.

(3) Third Modified Example

A third modified example is characterized by that all of the keys of the keyboard are divided into two divisions, i.e., accompaniment division and melody division. And discontinuity in key-touch response emerges between those divisions. In each division, the same overall slide area can be set so that the same key-touch response is obtained. Or the key-touch responses of the keys belonging to each division can be gradually shifted.

(4) Fourth Modified Example

Figure 35:
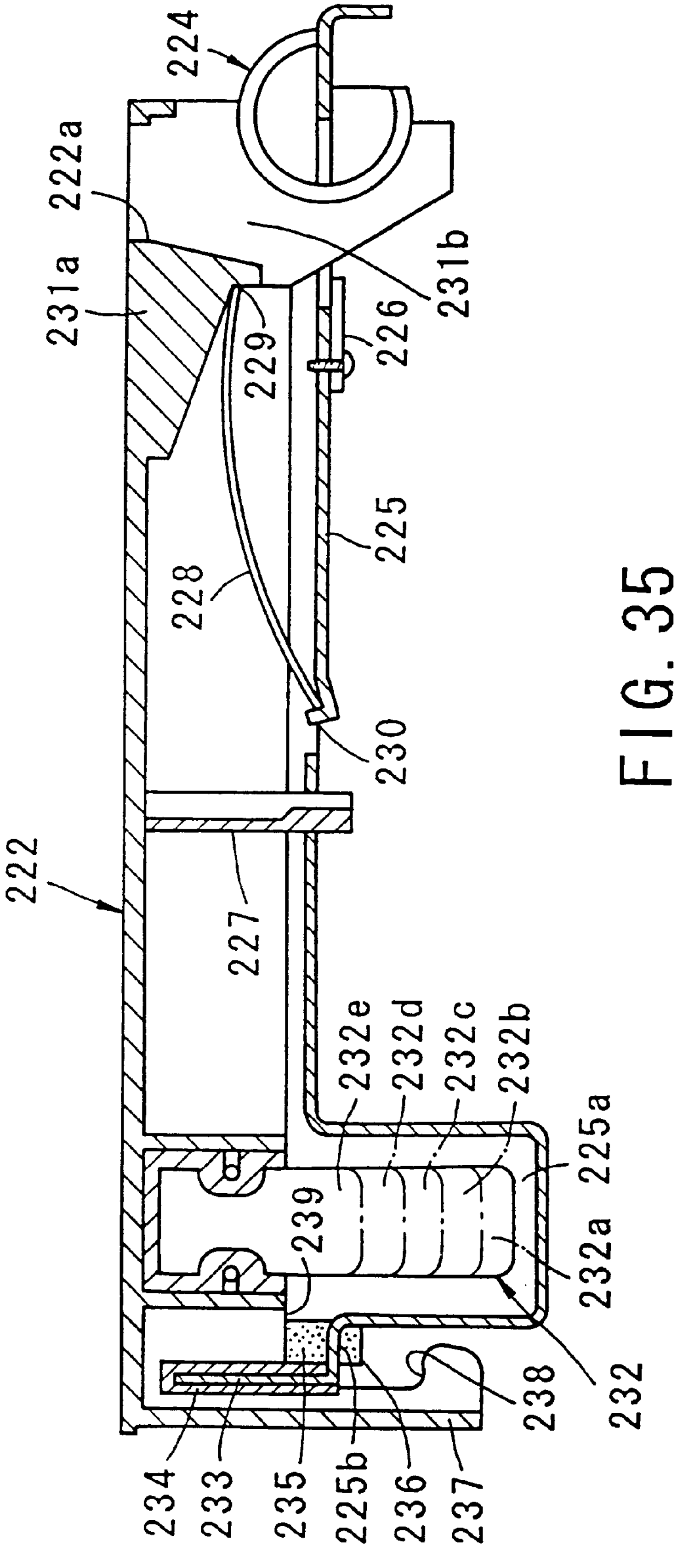
FIG. 35 is a cross-sectional view illustrating a structure of a keyboard assembly according to a fourth modified example of the third embodiment.

FIG. 35 shows a keyboard assembly according to a fourth modified example of the third embodiment. This example is characterized that a key scaling is performed by adjusting viscous resistance at a support-point member 224 which rotatably supports a key 222. In FIG. 35, a front-end portion of a key support member 225, which is made by metal material, is bent downwardly to form a pocket 225*a*. A touch-response deadweight 232 is fixed to a lower portion of the key 222 and is moved downwardly inside of the pocket 225*a*. As the touch-response deadweight 232, one of deadweights 232*a*, 232*b*, 232*c*, 232*d* and 232*e*, each having a different size, is selectively used by each of the keys. An adequate selection for those deadweights will accomplish a key scaling to key-touch responses.

A part of the front-end portion of the key support member 225 is provided as a shelf 225*b* which projects in a horizontal direction. A front-end portion of the shelf 225*b* is subjected to rapping mold to form an element 233 whose width is smaller than a distance between side walls of the slide-guide element 237 of the key 222. The element 233 is bent upwardly to stand vertically.

The element 233 is covered by a synthetic-resin member which is formed by the out-sert formation so that a key guide 234 is formed. A manner of key scaling as shown by FIG. 32 or 34 can be effected on the key guide 234 of FIG. 35. In addition, another key scaling, which corresponds to the second term of the aforementioned formula, can be combined with a key scaling to be performed with respect to the support-point member 224 which will be described later. There are provided a lower-limit stopper 235 and an upper-limit stopper 236, both of which are made by felt material. The lower-limit stopper 235 is adhered to an upper surface of the shelf 225*b*, while the upper-limit stopper 236 is adhered to a lower surface of the shelf 225*b*. A slide-guide element 237 is provided in connection with the lower-limit stopper 235 and the upper-limit stopper 236; and a low-end portion thereof is bent in a letter 'L' like shape. An upper edge 238 of the bent low-end portion of the slide-guide element 237 comes in contact with the upper-limit stopper 236, while a lower edge 239 of the key 222 comes in contact with the lower-limit stopper 235. FIG. 35 shows a state in which the low edge 239 comes in contact with the lower-limit stopper 235.

As similar to the aforementioned third embodiment, the key 222 is moved responsive to a depression of key within a key-depression stroke between the upper-limit stopper 236 and the lower-limit stopper 235. When a depression to the key 222 is released, a key-return spring 228 presses the key 222 upwardly. Thereafter, when the upper edge 238 of the slide-guide element 237 comes in contact with the upper-limit stopper 236, a key-depression motion is stopped at an upper-limit position of the key 222.

Similar structural points of the key guide 216 shown in FIG. 32 can be applied to the key guide 234. That is, the geometric shape of the key guide 216 can be applied to the key guide 234; the grease can be provided at slide areas at side faces of the key guide 234 so as to cause viscous resistance; a recess can be provided between two slide areas, vertically arranged on each of the side faces of the key guide 234, so as to adjust the viscous resistance and to provide a grease bank as well; and a channel or a recess can be formed at the slide area of the key guide 234 as the grease bank. However, since the fourth modified example is designed to perform a key scaling mainly by adjusting the viscous resistance at the support-point member 224, the fourth modified example is not necessarily restricted by the above structural points.

As similar to the foregoing examples, the key-return spring 228 of the fourth modified example is formed by a plate spring having a long and slender shape. One end of the key-return spring 228 is terminated by a spring-terminating portion 230, which is formed by a part of the key support member 225 by press working, while another end of the key-return spring 228 is terminated by a spring-terminating portion 229 which is provided inside of the key 222. The key-return spring 228 imparts key-return force to the key 222. In addition, the key-return spring 228 press the support-point member 224 in a back-side direction of the key support member 225 as well. The key-return spring 228 is bent upwardly to yield elastic resilience, by which the key 222 is pressed upwardly.

Figure 36:
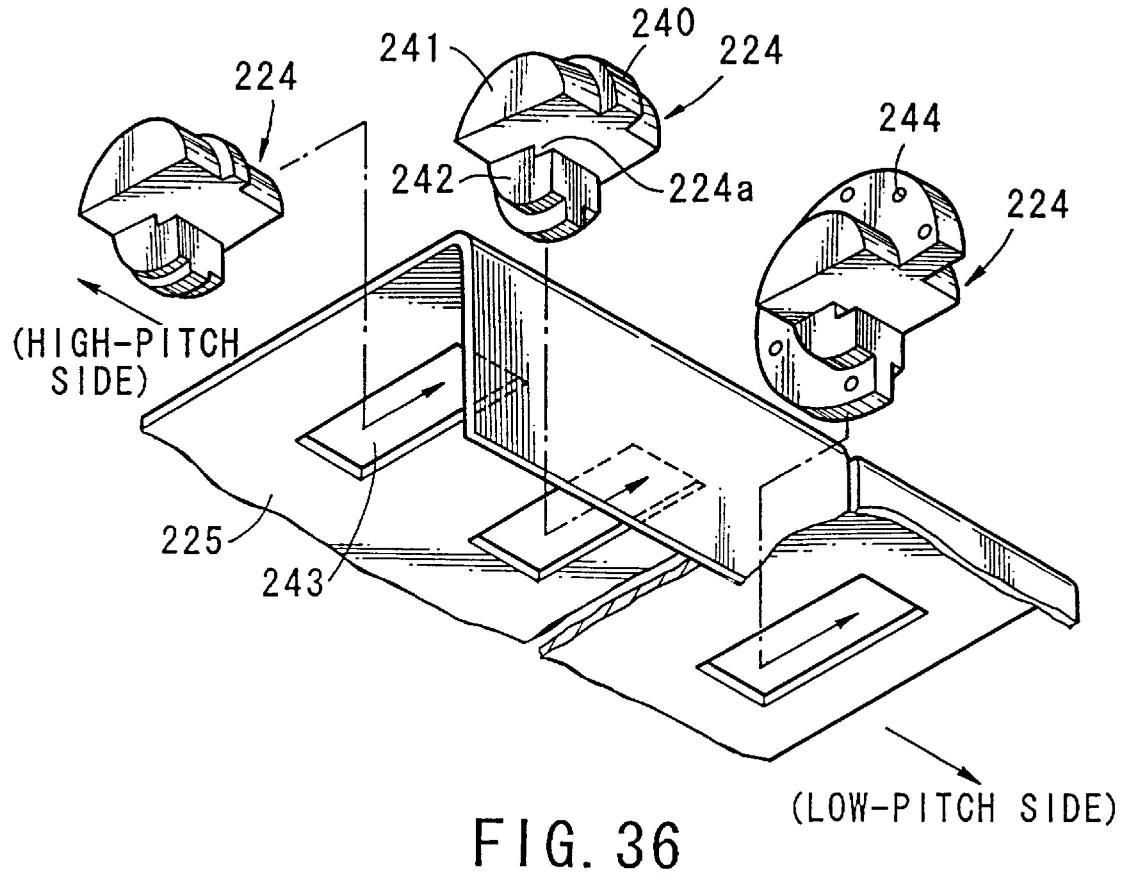
FIG. 36 is a perspective view illustrating a way of engaging a support-point member with a key support member in the keyboard assembly of FIG. 35.

Horizontal component of the elastic resilience of the key-return spring 228 presses the key 222 through the support-point member 224 toward an back edge of a square hole 243 (see FIG. 36). The support-point member 224 has a cut-in portion 224*a*which fits with a plate thickness of the key support member 225. The back edge of the square hole 243 engages with the cut-in portion 224*a* of the support-point member 224, so that the support-point member 224 can be assembled with the key support member 225 in a stable manner.

A synthetic-resin sheet 226 is attached to a lower surface of the key support member 225 by rivets. As similar to the aforementioned synthetic-resin sheet 205, the synthetic-resin sheet 226 functions to prevent the key 222 from being put off when the key 222 is pulled in a front direction. In the case of the maintenance or when exchanging the key or other parts, a right-edge portion of the synthetic-resin sheet 226 is depressed down from a hole 222*a*; and then, the key 222 is pulled in the front direction. Thus, the key 222 can be disassembled from the keyboard assembly.

As similar to the third embodiment of FIG. 31, a main printed substrate (not shown), on which switch circuits and/or control circuits are fabricated, is provided beneath the key support member 225 at its roughly center portion. A key switch (not shown) is mounted on the main printed substrate in connection with each of the keys. An actuator 227, which projects downward from the key 222, is provided to depress the key switch and is inserted through the key support member 225.

Figure 37:
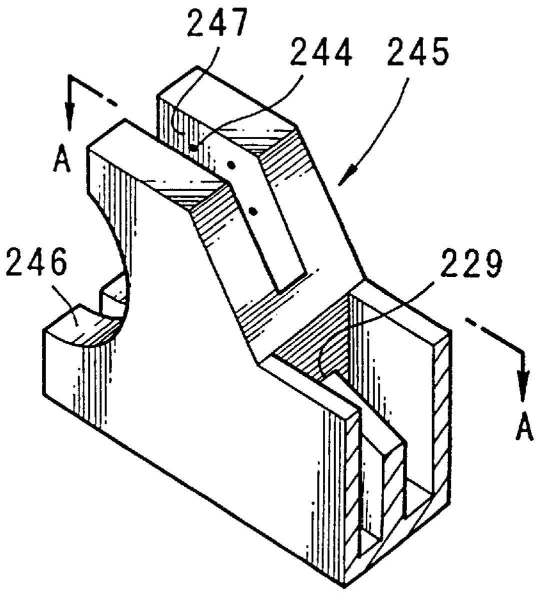
FIG. 37 is a perspective view illustrating a slide-engage member which is attached to a back-end portion of a key of the keyboard assembly of FIG. 35.

FIG. 36 is a perspective view showing the support-point members 224; and FIG. 37 is a perspective view showing a slide-engage member 245 which is provided in connection with the support-point member 224. The support-point member 224 comprises a disk-like flange 240 and two bosses 241 and 242. The flange 240, a part of which is cut out, is sandwiched by the boss 241 which has a symmetrical half-cylinder-like shape. The boss 242, having a symmetrical quarter-cylinder-like shape, is provided as a lower portion of the support-point member 224. A width of the flange 240 is set to fit with a channel 247 of the slide-engage member 245 which is provided at the back-end portion of the key 222. A width of the boss 242 is set to fit with a lateral width of the square hole 243 which is formed through the key support member 225 by the punching press. A sectional area of the boss 241 has a semicircular shape, while a sectional area of the boss 242 has roughly a quarter of a circular shape.

In order to clarify the structure of the slide-engage member 245 is illustrated upside down in FIG. 37. A curved shape of a slide-contact face 246 of the slide-engage member 245 is set to fit with a common circular shape at exterior faces of the bosses 241 and 242 of the support-point member 224. The slide-contact face 246 is formed roughly in a half-circular arc of 180° or more such that the support-point member 224 does not fall apart from the slide-contact face 246. Thus, a open part of the circular arc other than the slide-contact face 246 is less than 180°. In order to place the support-point member 224 to come in contact with the slide-contact face 246 of the slide-engage member 245 through the above-mentioned open part of the circular arc, a quarter circular portion of about 45° is cut out from the support-point member 224. When assembling those members, the cut-out portion of the support-point member 224 is rotated by a certain angle so that the support-point member 224 can be inserted into the slide-contact face 246 of the slide-engage member 245; and then, the cut-out portion is rotated backward so that the support-point member 224 will not fall apart from the slide-contact face 246. Thus, the slide-engage member 245, provided at the back-end portion of the key 222, is rotatably supported by the support-point member 224; and the support-point member 224 is prevented from falling apart from the key 222.

As described above, the support-point member 224 securely engages with the key 222 by means of the slide-engage member 245. Then, the boss 242 of the support-point member 224 is inserted into the square hole 243 which is formed through the key support member 225. Thereafter, the support-point member 224 is moved in a backward direction while a lower face of the boss 241 slides along the upper surface of the key support member 225. Finally, the cut-in portion 224*a* of the support-point member 224 engages with the back edge of the square hole 243, so that the support-point member 224 securely engages with the key support member 225. After assembling those members, the open part of the circular arc other than the slide-contact face 246 of the slide-engage member 245 does not coincides with the cut-out portion of the support-point member 224 as-long as the key 222 is moved within a range of the key-depression stroke. Therefore, a mutual connection between those members does not dissolved in the normal performance state.

In the keyboard assembly according to the fourth modified example, side faces of the flange 240 slide with interior walls of the channel 247 of the slide-engage member 245 provided at the back-end portion of the key 222. The present example is characterized by that a key scaling to key-touch responses is performed by changing a side area of the flange 240. As shown in FIG. 36, the side area of the flange 240 of the support-point member 224 Is increased in a pitch-descending order. Specifically, a side area of a flange of a support-point member, provided for a key having a higher pitch, is made small; in other words, a height of the flange is made low. On the other hand, a side area of a flange of a support-point member, provided for a key having a lower pitch, is made large; in other words, a height of the flange is made high. Such manner of key scaling is performed with respect to each key, with respect to each set of three or four keys, with respect to a half-octave division of the keyboard, with respect to one-octave division of the keyboard or with respect to two-octave division of the keyboard. Incidentally, small recesses '244' are provided at the interior walls of the channel 247 as well as the side faces of the flange 240; and those recesses 244 are provided as the grease bank. Such small recesses can be provided at the slide-contact face 246 as well.

As described above, the present example is designed to perform a key scaling to key-touch responses by changing the shape of the support-point member 224. However, as shown in FIG. 37, all of the slide-engage members, provided at the back-end portions of the keys, have the common shape and size, regardless of a difference in size or shape of the support-point members. Therefore, the assembling operations are not troublesome; and a common metal mold can be used to form those members, which will contribute to a reduction to the cost of manufacturing the keyboard assembly.

(5) Fifth Modified Example

The slide area between the support-point member 224 and the slide-engage member 245 exists between the slide-contact face 246 of the slide-engage member 245 and the common exterior face between the bosses 241 and 242 of the support-point member 224. A fifth modified example is designed to perform a key scaling to key-touch responses by changing the above slide area. In short, a lateral width of the boss 241 and/or a lateral width of the boss 242 is changed so as to alter viscous resistance between the support-point member 224 and the slide-engage member 245. An illustration of the fifth modified example is omitted. As similar to the aforementioned examples, the present example provides the grease bank, having a channel-like shape or a blind-hole-like shape, at the exterior faces of the bosses 241 and 242 and/or the slide-contact face 246.

(6) Sixth Modified Example

Figure 38:
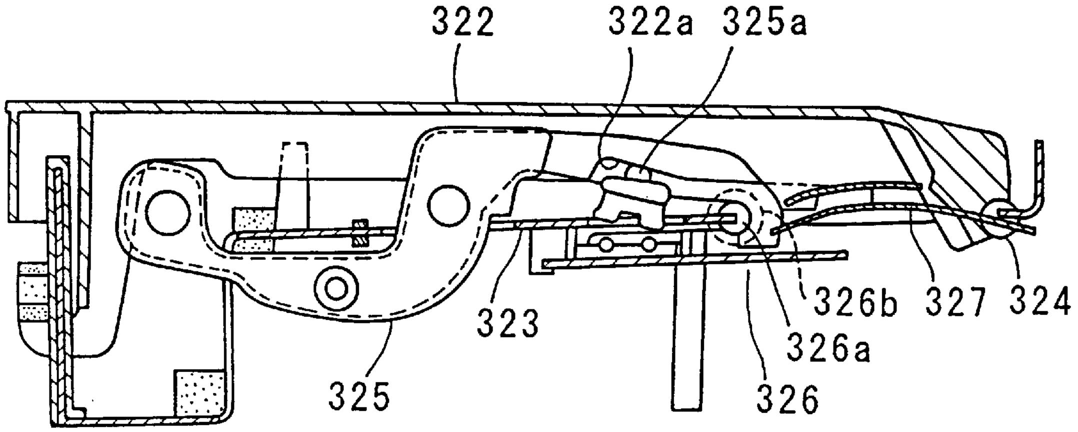
FIG. 38 is a cross-sectional view illustrating a structure of a keyboard assembly according to a sixth modified example of the third embodiment.

FIG. 38 is a cross-sectional view illustrating a structure of a keyboard assembly according to a sixth modified example of the third embodiment. This keyboard assembly provides a hammer with respect to each of the keys. Herein, a key 322 is rotatably supported by a key support member 323 in such a way that the key 322 rotates about a support-point member 324. A hammer 325 is provided in an interior space of the key 322. A support-point member 326 is fixed to a back-end portion of the key support member 323. The hammer 325 rotates about the support-point member 326. A drive part 322*a* of the key 322 depresses a driven part 325*a* of the hammer 325, so that the hammer 325 interacts with the operation of the key 322. A restoring member 327 is provided to restore the key 322 and the hammer 325. Detailed structure of this keyboard assembly is disclosed by U.S. Pat. No. 4,901,614, except the support-point structure for the hammer 325.

In the sixth modified example, a key scaling is performed by changing a slide area of the support-point member 326 of the hammer 325 in such a way that the slide area is decreased in a high-pitch side of the keyboard, while the slide area is increased in a low-pitch side of the keyboard. Thus, the sixth modified example performs the key scaling as similar to the aforementioned example of FIG. 36. Moreover, the sixth modified example is designed such that the grease or the like is painted on the slide area of the support-point member 326 of the hammer 325, by which a key scaling to key-touch responses is performed. In FIG. 38, a support-point member 326*a*, provided for a key belonging to the high-pitch side of the keyboard, is smaller than a support-point member 326*b*, drawn by a dotted line, which is provided for a key belonging to the low-pitch side of the keyboard. So, the size of the support-point member of the hammer is gradually increased in a pitch-descending order. In the present example, the size of the support-point member 326 is changed by changing a diameter. Instead, it is possible to change an axial length (i.e., width) of the support-point member 326, by which the slide area is changed to perform a key scaling.

(7) Seventh Modified Example

A seventh modified example of the third embodiment is characterized by that as shown in FIG. 35, the touch-response deadweight 232 is provided at a front portion of the key 222. Herein, by changing the deadweight as shown by the numerals 232*a* to 232*e*, a key scaling to key-touch responses is performed. Thus, by changing the total weight of the key 222, it is possible to perform a key scaling corresponding to the first term of the aforementioned formula which uses the mass 'm' as the parameter. By performing a key scaling of the present example, which responds to a change of the mass of the key, in addition to another key scaling or other key scalings, it is possible to improve a simulation, which simulates the key-touch responses of the non-electronic piano, with a simple structure.

(8) Eighth Modified Example

An eighth modified example (see FIG. 33) is provided to concern with an adjustment to the key scaling corresponding to the third term of the aforementioned formula which contains the spring constant 'ks' as the parameter. As shown in FIG. 31, the synthetic-resin member 212 is formed by the out-sert formation on the root portion of the key-return spring 213. Herein, the location of the root portion of the key-return spring 213 is changed in response to the touch response of each key so as to establish a certain positional relationship between the root portions of the key-return springs. Such positional relationship will yield a difference between amounts of displacement of the key-return springs, each of which is bent upwardly when being assembled with the key. Thus, a certain touch response can be set for each of the keys. Further, it is possible to employ the key scaling of the aforementioned fourth modified example (see FIG. 35), in which a location of the spring-terminating portion 230 is changed in a longitudinal direction of the key 222 so as to control an amount of bending displacement of the key-return spring 228. Furthermore, in order to perform a key scaling to the reaction of the key-return spring 228 by changing a vertical location of the spring-terminating portion 229, a thick-end portion 231*a*, which projects downward from the back-end portion of the key 222, can be changed in vertical thickness with respect to each key.

In the present example, as elasticity 'Fs' of the key-return spring, where $Fs=ks(\alpha+x)$, a bias '$\alpha$' is applied to the key-return spring (213 or 228); thus, a key scaling using the elasticity of the key-return spring, is effected in addition to a key scaling using viscous resistance corresponding to an initial deformation of the key-return spring. By changing the thickness of the thick-end portion 231*a* or by changing a thickness of a back-end wall 231*b*, a location of the spring-terminating portion 229, which terminated the end of the key-return spring 228. Thus, it is possible to adjust the amount of bending displacement of the key-return spring 228 in a variety of ways. Therefore, the bias α, used for performing the key scaling, can be changed.

In the key scaling which is performed by the present invention by adjusting the amount of bending displacement of the key-return spring, the bias α is changed. Instead, it is possible to change the material, plate thickness, width and length of the key-return spring so that the reaction of the key-return spring will be changed using 'ks' as the parameter. In short, a key scaling, which corresponds to a change of the reaction of the key-return spring, can be performed in addition to a key scaling which corresponds to a change of the viscous resistance. Thus, it is possible to improve a simulation which simulates the touch responses of the non-electronic pianos.

As described heretofore, the third embodiment and its examples can offer a variety of ways in combination of the parameters which relate to the key scaling and each of which is adjustable. Thus, it is possible to perform the key scaling which is embodied by controlling a combination of the parameters. In short, the third embodiment is advantageous in that a variety of ways to control the key scaling can be presented in accordance with a variety of demands which correspond to an objective of musical performance, productivity for manufacturing the keyboard assembly and cost of manufacturing the keyboard assembly.

Lastly, the keyboard assembly of the present invention is not restricted by the parts and arrangement of the parts shown by the drawings.

As this invention may be embodied in several forms without departing from the spirit of essential characteristics thereof, the present embodiments are therefore illustrative and not restrictive, since the scope of the invention is defined by the appended claims rather than by the description preceeding them, and all changes that fall within meets and bounds of the claims, or equivalence of such meets and bounds are therefore intended to be embraced by the claims.

What is claimed is:

1. A keyboard assembly for an electronic musical instrument comprising;

a plurality of keys, each of which provides a slide-guide element having internal wall surfaces and projecting downwardly from a lower portion thereof in proximity to a front-end portion thereof;

a key support member for rotatably supporting the plurality of keys, the key support member providing a plurality of key guides having slide surfaces which are arranged in connection with the plurality of keys, wherein said internal wall surfaces of said slide guide element contact said slide surfaces of said key guides to form at least one slide area, wherein each key guide slides within an interior portion of the slide-guide element while the key is depressed and is returned to a normal position;

viscous material which is located between the key guide and the slide-guide element to provide viscous resistance for the key when being moved; and a plurality of key-return springs, each of which is provided between the key and the key support member to press up the key to the normal position, wherein key scaling of key-touch response for said keys is actualized by employing different characteristics with regard to the at least one slide area for at least two keys, which characteristics vary in a prescribed manner in accordance with the positions of the keys which are arranged sequentially.

2. The keyboard assembly of claim 1, wherein the different characteristics are obtained by employing different sizes for the slide area for at least two keys.

3. A keyboard assembly for an electronic musical instrument according to claim 1 wherein the key scaling is performed by changing the key guide with respect to a size and/or a shape, wherein said slide surfaces of said key guide are changed, thereby changing the characteristics of said slide area.

4. A keyboard assembly for an electronic musical instrument comprising:

a plurality of keys;

a key support member for rotatably supporting the plurality of keys;

a plurality of support-point members, each of which is securely fixed to the key support member and is placed between a back-end portion of each key and a back-end portion of the key support member so that each key rotates about the support-point member, wherein said back-end portion of each key and said support point member form a slide area;

viscous material which is located between the back-end portion of the key and the support-point member so as to provide viscous resistance between the back-end portion of the key and the support-point member when the key rotates about the support-point member in response to a depression of the key; and a plurality of key-return springs, each of which is provided between the key and the key support member so as to press up the key to a normal position, wherein key scaling of key-touch response of the keys is performed by employing different characteristics of said slide area for at least two keys, which characteristics vary in a prescribed manner in accordance with the positions of the keys which are arranged sequentially.

5. The keyboard assembly for an electronic musical instrument of claim 4, wherein each of said plurality of keys further comprise a deadweight member, said deadweight member comprising a plurality of deadweights each having a different size selectively used by each key, whereby key scaling is further performed by employing said plurality of deadweights in a prescribed varying fashion with respect to each key or with respect to each division of a keyboard.

6. A keyboard assembly for an electronic musical instrument according to claim 4 wherein key scaling is performed by changing the support-point member with respect to size and/or a shape, thereby changing the characteristics of said slide area formed between said back-end portion of the key and said support-point member.

7. A keyboard assembly for an electronic musical instrument according to claims 1, 4 or 5 further comprising spring adjusting means for adjusting an amount of bending displacement of the key-return spring.

8. A keyboard assembly for an electronic musical instrument according to claim 1 or 4 wherein the viscous material is grease.

9. A keyboard assembly for an electronic musical instrument comprising:

a plurality of keys;

a key support member for rotatably supporting the plurality of keys;

a plurality of key-return springs, each of which is provided between the key and the key support member so as to press up the key to a normal position;

a plurality of hammers, each of which rotates about a support-point member in response to a depression of the key, the support point member being located between a back-end portion of the hammer and a back-end portion of the key support member; and viscous material which is located between the back-end portion of the hammer and the support-point member, wherein a key scaling of key-touch response is obtained by employing different sizes and/or shapes for the support-point member for at least two keys.

10. A keyboard assembly for an electronic musical instrument comprising:

a plurality of keys;

a key support member which supports the plurality of the keys rotatably;

a plurality of viscousness imparting members each of which is located between one of the plurality of keys and the key support member and provides viscous resistance for the respective key when being moved;

a plurality of key-return members each of which is provided for one of the plurality of keys to press up the respective key to a normal position; and key-scaling means provided for each of the plurality of keys for performing a key scaling with respect to the viscous resistances of the plurality of the keys.

11. A keyboard assembly for an electronic musical instrument according to claim 10, wherein each of the plurality of keys has a slide-guide element which projects downwardly from a lower portion thereof, and the key support member has a plurality of key guides each of which is arranged to have the slide-guide element slide thereon when the key is depressed and is returned to the normal position, and wherein a slide area between the slide-guide element and the key guide with respect to each key is changed to perform the key scaling as the key-scaling means.

12. A keyboard assembly for an electronic musical instrument according to claim 11, wherein each of the plurality of viscousness imparting members has viscous material which is provided around the slide area to control the viscous resistance.

13. A keyboard assembly for an electronic musical instrument according to claim 10, wherein the key support member has a plurality of support-point members each of which is securely fixed to the key support member and rotatably supports a back-end portion of one of the plurality of keys while having the back-end portion slide therein when the key is depressed and is returned to the normal position, and wherein a slide area between the support-point member and the back-end portion with respect to each key is changed to perform the key scaling as the key-scaling means.

14. A keyboard assembly for an electronic musical instrument according to claim 13, wherein each of the plurality of viscousness imparting members has viscous material which is provided around the slide area to control the viscous resistance.

15. A keyboard assembly for an electronic musical instrument comprising:

a plurality of keys;

a key support member which supports the plurality of the keys rotatably;

a plurality of hammers each of which is provided for one of the plurality of the keys and is supported by the key support member rotatably;

a plurality of viscousness imparting members each of which is located between one of the plurality of hammers and the key support member and provides viscous resistance for the respective key when being moved;

a plurality of key-return members each of which is provided for one of the plurality of keys to press up the respective key to a normal position; and key-scaling means provided for at least some of the plurality of hammers for performing a key scaling with respect to the viscous resistances of the plurality of the keys.

16. A keyboard assembly for an electronic musical instrument according to claim 15, wherein each of the plurality of viscousness imparting members has a support-point member each of which is securely fixed by the key support member and rotatably supports a back-end portion of the hammer while having the back-end portion slide therein when the key is depressed and is returned to the normal position, and wherein a slide area between the support-point member and the back-end portion with respect to each key is changed to perform the key scaling as the key-scaling means.

17. A keyboard assembly for an electronic musical instrument according to claim 15, wherein each of the plurality of viscousness imparting members has viscous material which is provided around the slide area to control the viscous resistance.

* * * * *